US007036659B2

(12) United States Patent
Mitsuyama

(10) Patent No.: US 7,036,659 B2
(45) Date of Patent: May 2, 2006

(54) ANTITHEFT CASE

(76) Inventor: Masuhiro Mitsuyama, 1071, Kinugasa, Wake-cho, Wake-gun, Okayama (JP)

( * ) Notice: Subject to any disclaimer, the term of this patent is extended or adjusted under 35 U.S.C. 154(b) by 181 days.

(21) Appl. No.: 10/408,551

(22) Filed: Apr. 8, 2003

(65) Prior Publication Data

US 2004/0200744 A1    Oct. 14, 2004

(51) Int. Cl.
*B65D 85/57*    (2006.01)
(52) U.S. Cl. .................................. 206/308.2; 206/1.5
(58) Field of Classification Search ................ 206/1.5, 206/308.1, 308.2, 387.11; 70/57.1, 63
See application file for complete search history.

(56) References Cited

U.S. PATENT DOCUMENTS

| 5,823,341 | A  | * | 10/1998 | Nakasuji | ................ | 206/387.11 |
| 6,601,414 | B1 | * | 8/2003  | Chang    | ..................... | 206/308.2 |
| 6,601,415 | B1 | * | 8/2003  | Takinami | ..................... | 70/57.1 |
| 6,619,079 | B1 | * | 9/2003  | Cheung   | ....................... | 70/57.1 |
| 6,694,782 | B1 | * | 2/2004  | Mitsuyama | ................. | 206/1.5 |
| 6,719,133 | B1 | * | 4/2004  | Perez et al. | .................. | 206/1.5 |

* cited by examiner

Primary Examiner—Luan K. Bui
(74) Attorney, Agent, or Firm—Wenderoth, Lind & Ponack, L.L.P.

(57) ABSTRACT

An antitheft device is provided for a case for storing a commodity therein so as to protect the commodity from being removed from the case without permission. The case is composed of a box having an opening from which to insert and extract a commodity, and a lid which opens and closes the opening via appropriate hinges. A through hole is formed on a necessary position of peripheral walls which overlap with each other inside and outside the peripheral edges of the box and the lid, or which oppose each other, in such a manner that a key member can be inserted into or extracted from the through hole. In order to make use of the key member for protecting the case from being opened, it is possible to provide continuous convex-concave portions that are engaged with each other in necessary regions on a surface where an opposite side edge of the key member opposes the open edge of the through hole. It is also possible to provide a through hole on a necessary position on one of the peripheral walls overlapping with each other inside and outside of the peripheral edges of the box and the lid in such a manner that the key member can be inserted and extracted and can establish a latched relationship, whereas to provide a cut portion for avoiding collision with the key member so as to secure closing of the case on the other peripheral wall. A latch member is provided at an end of the key member, with the latch member establishing a latched relationship with the cut portion formed on either the box or the lid at a time of completion of insertion of the key member.

9 Claims, 31 Drawing Sheets

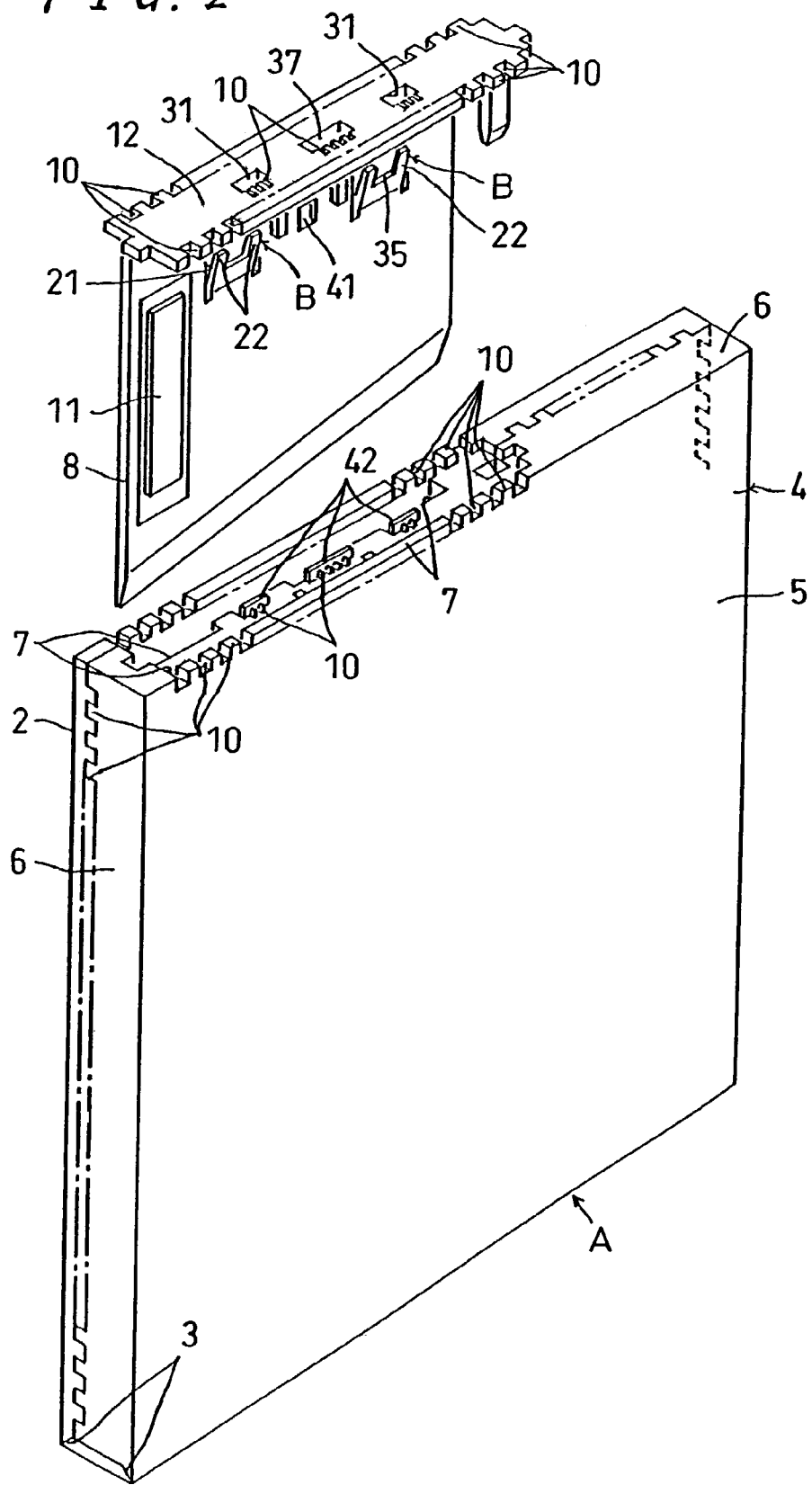

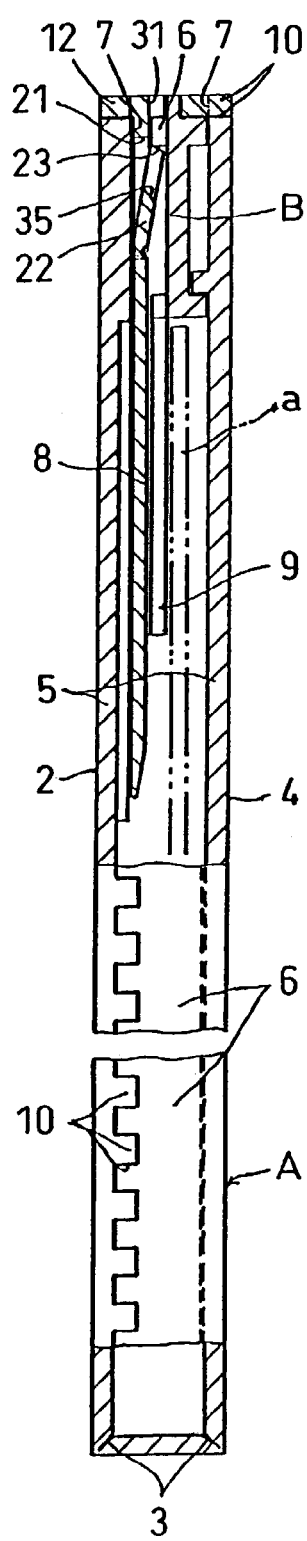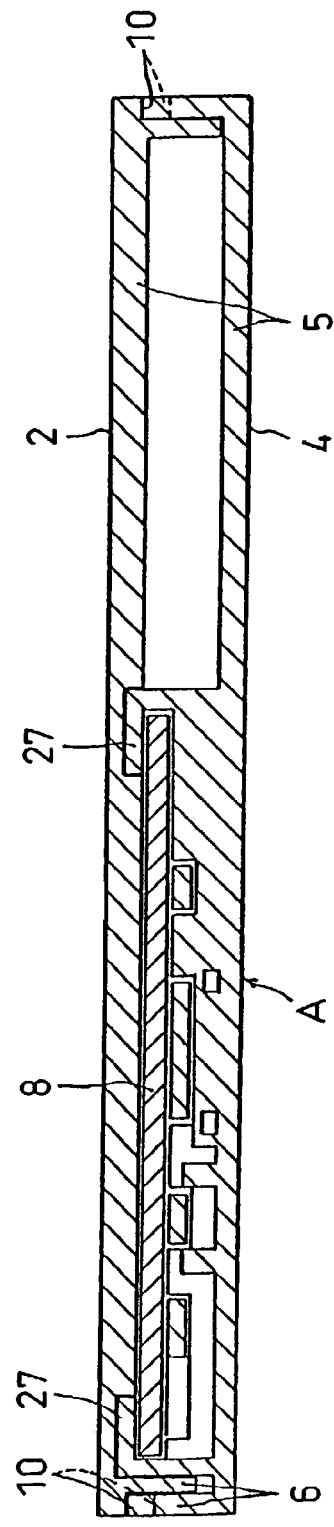

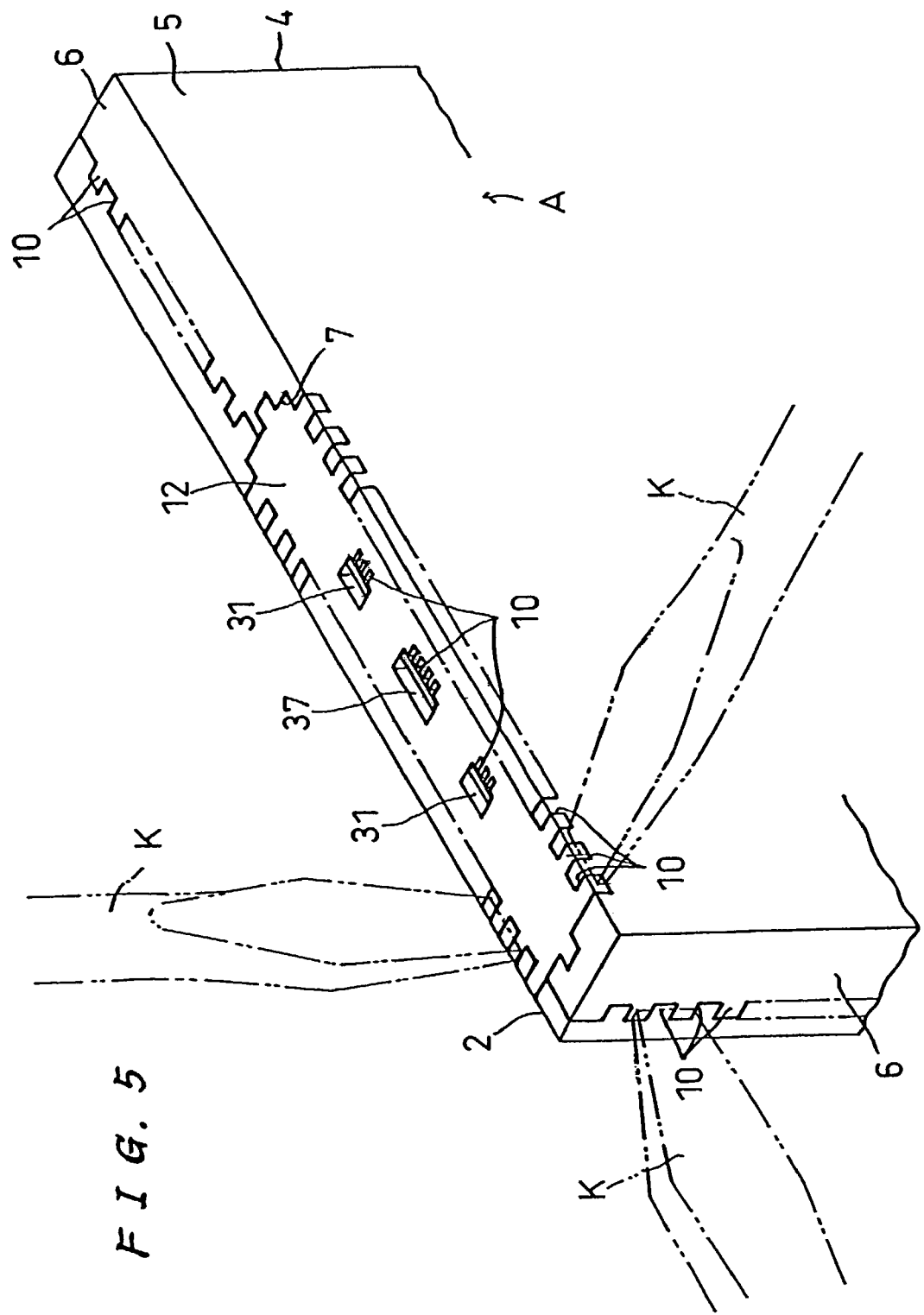

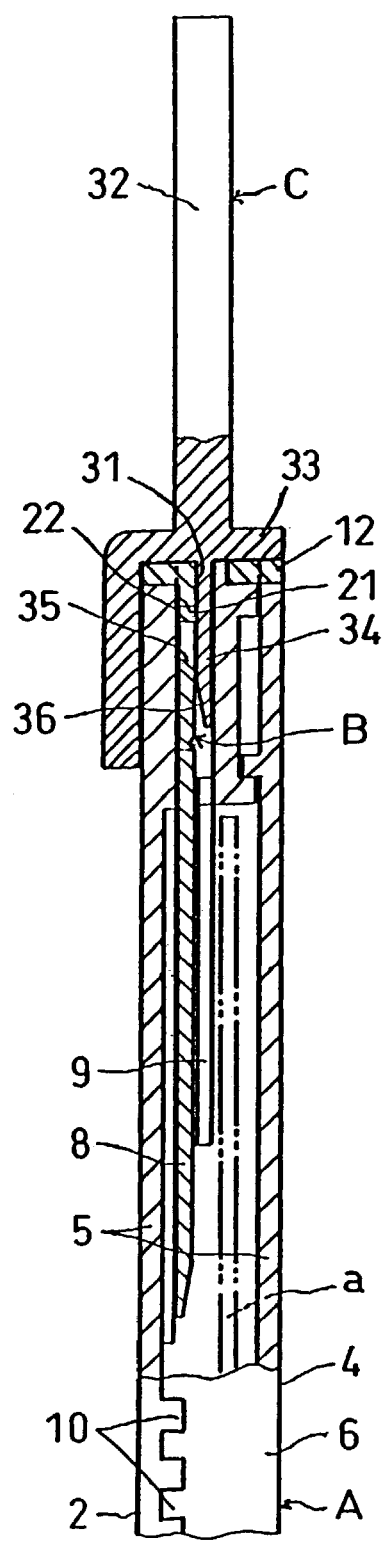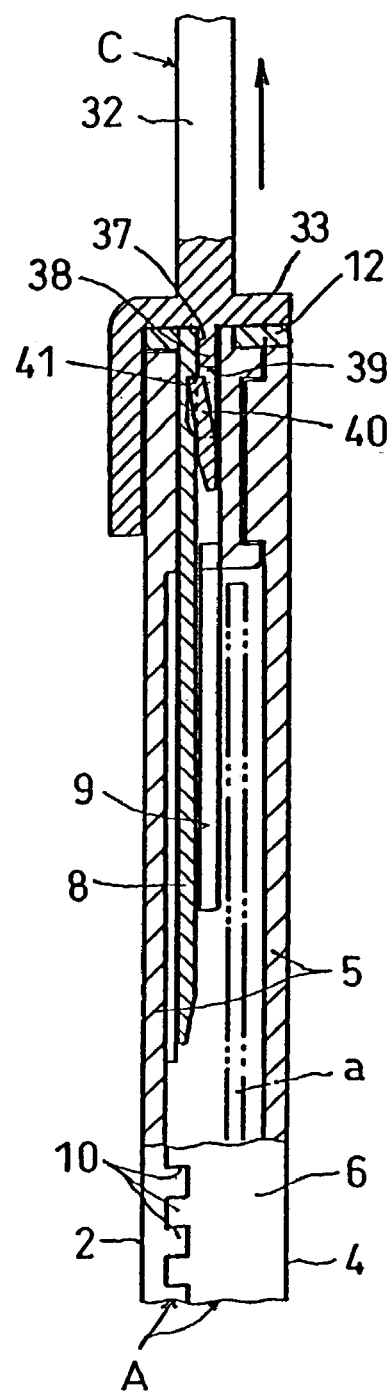

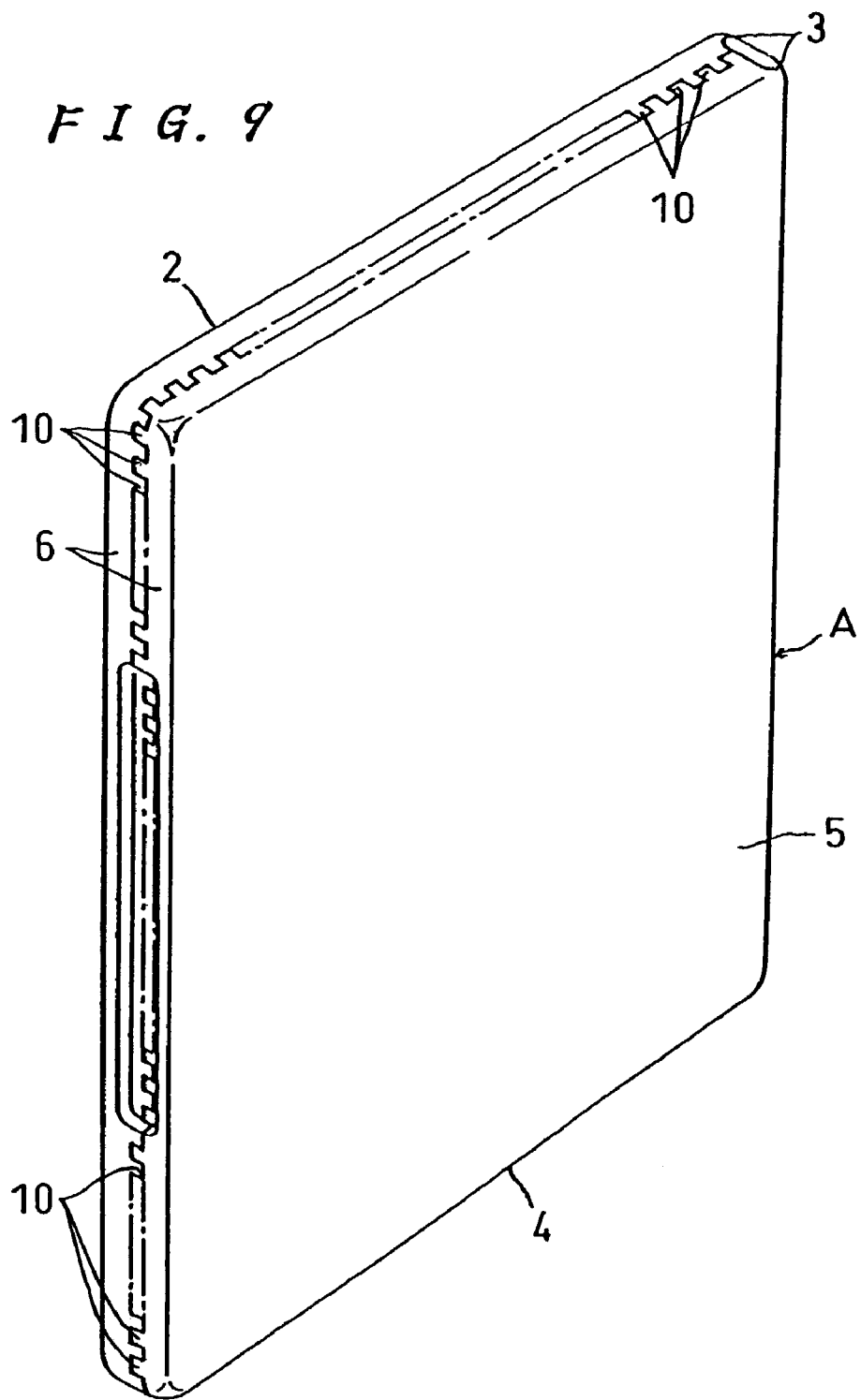

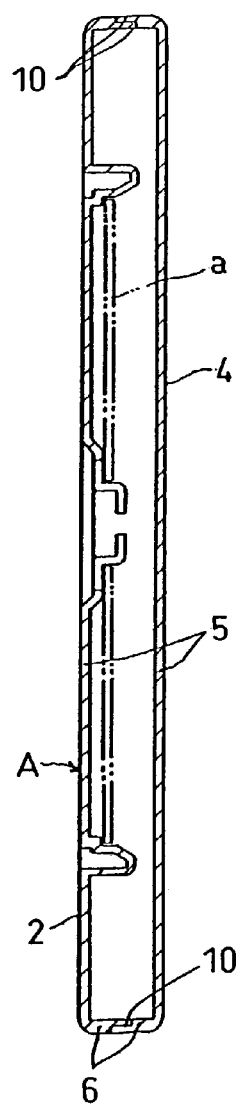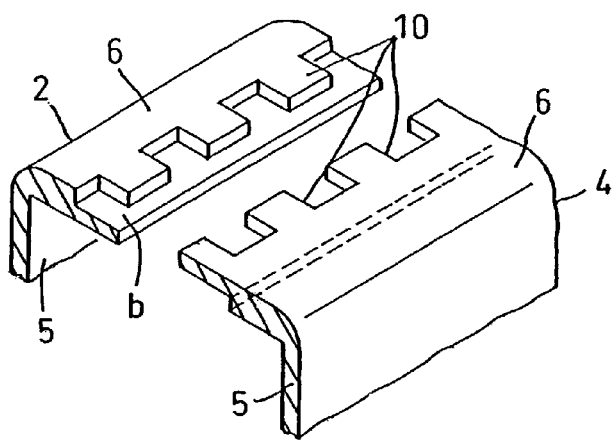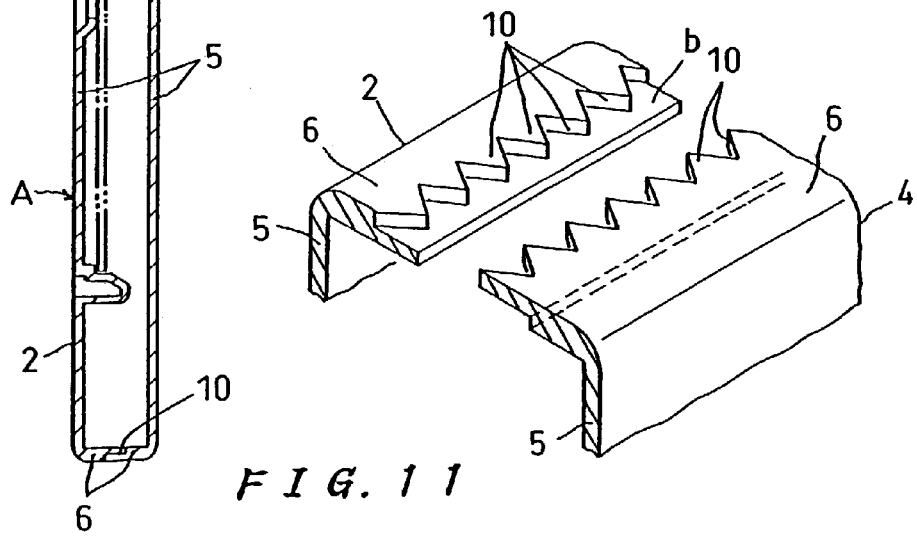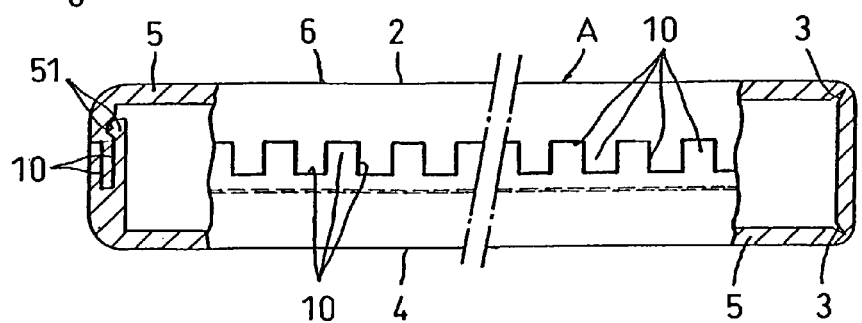

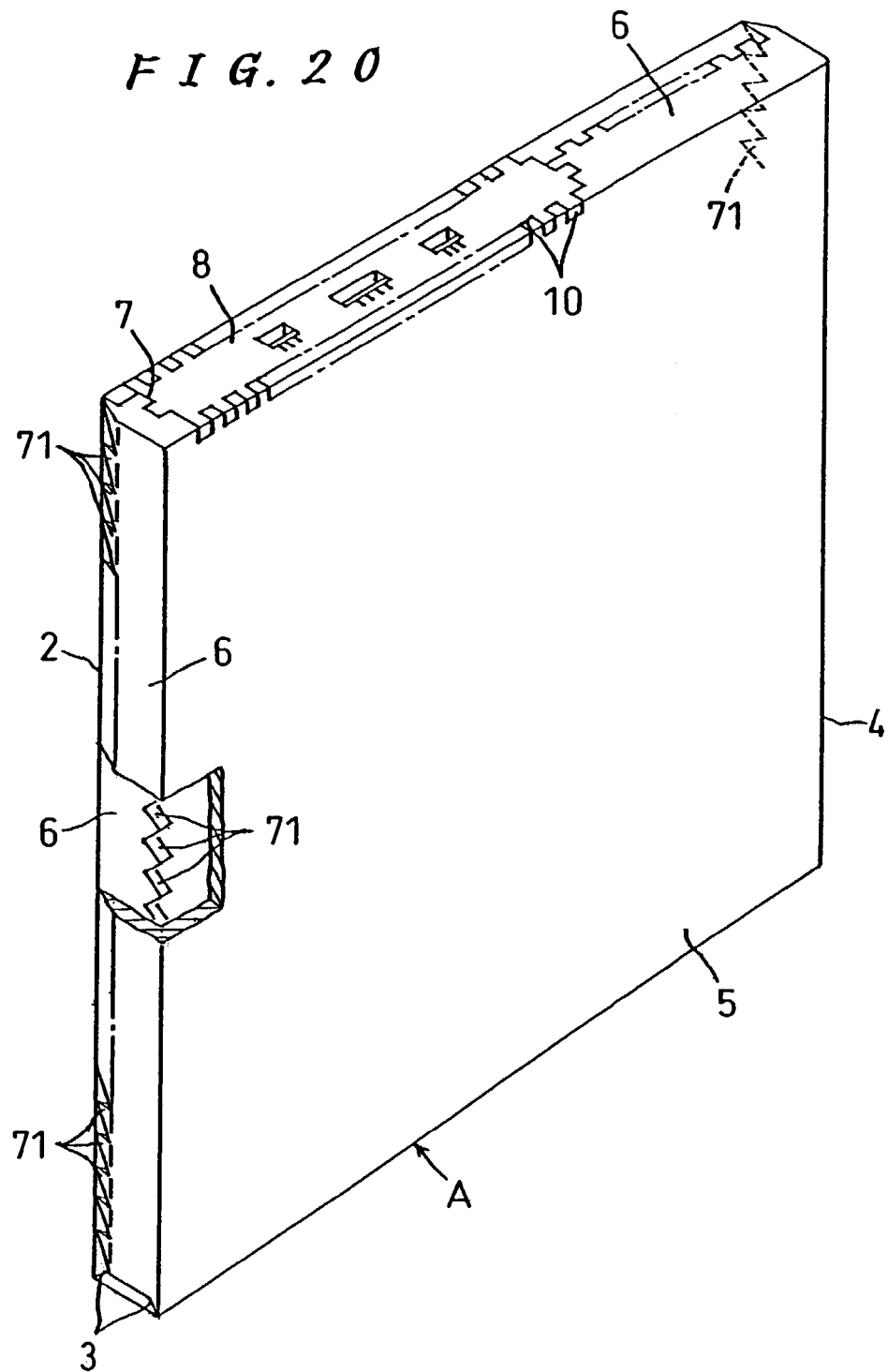

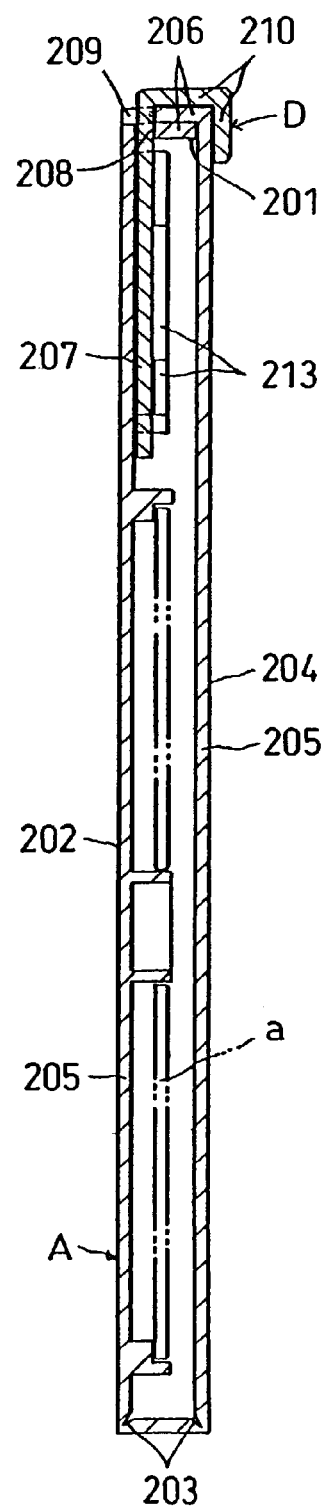
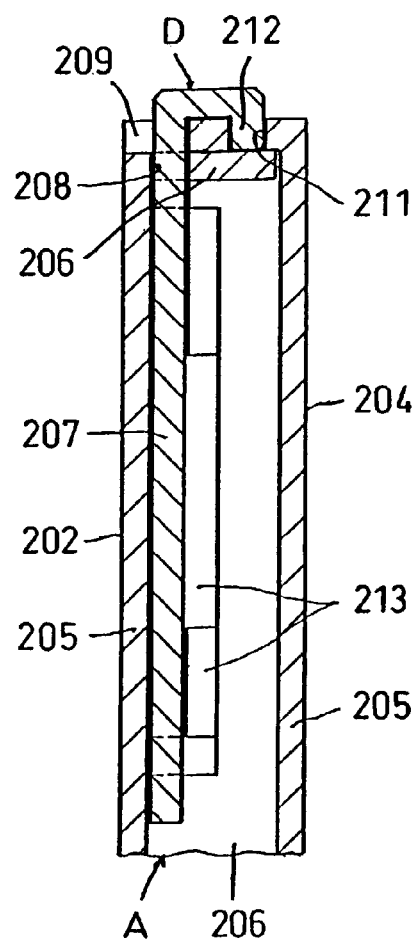
FIG. 25
FIG. 28

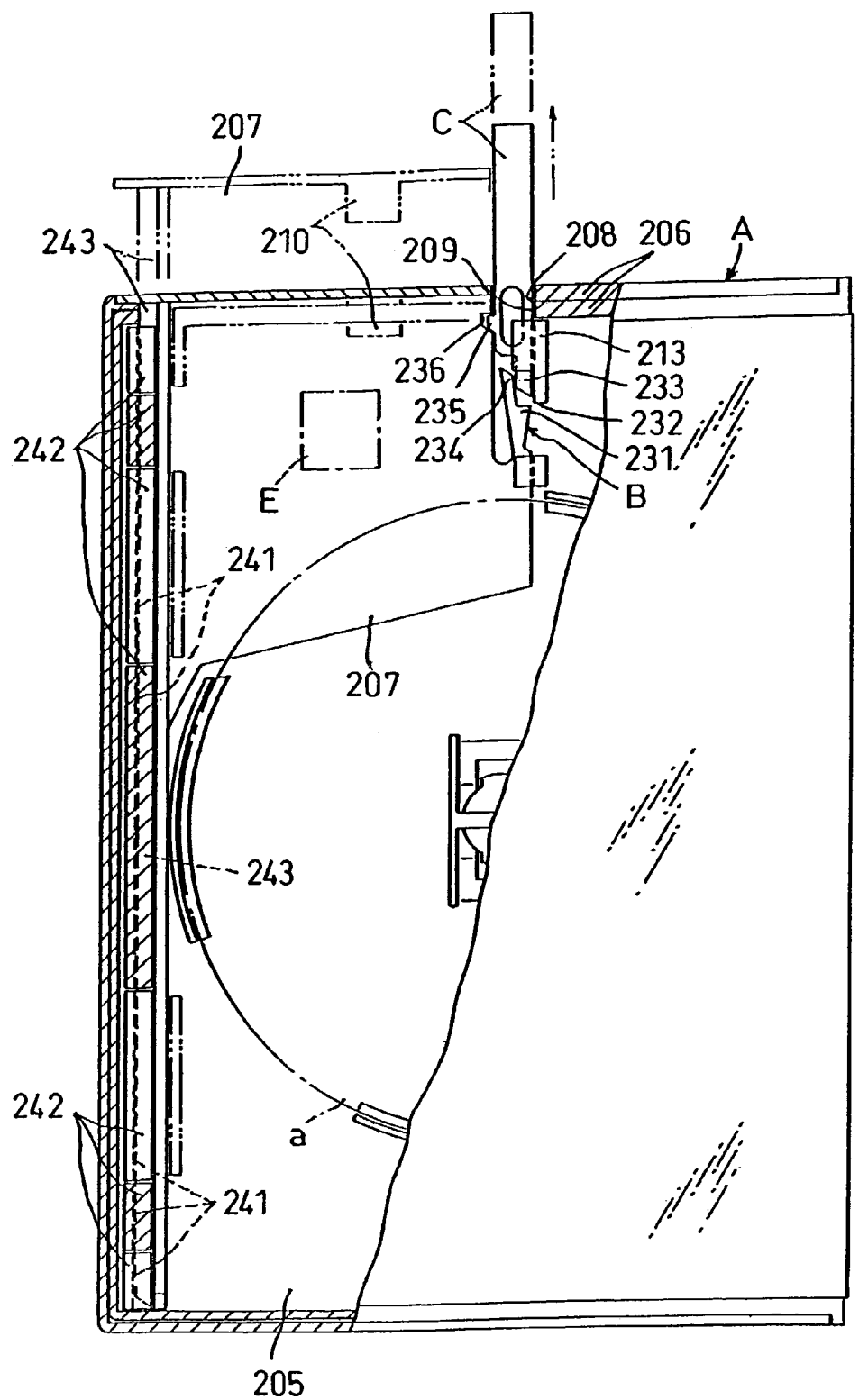

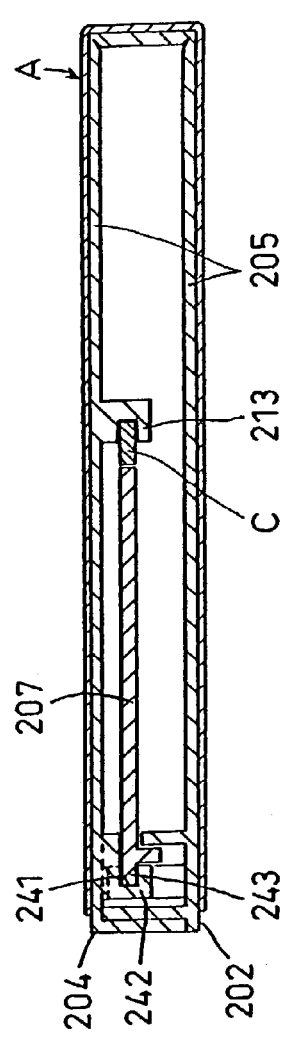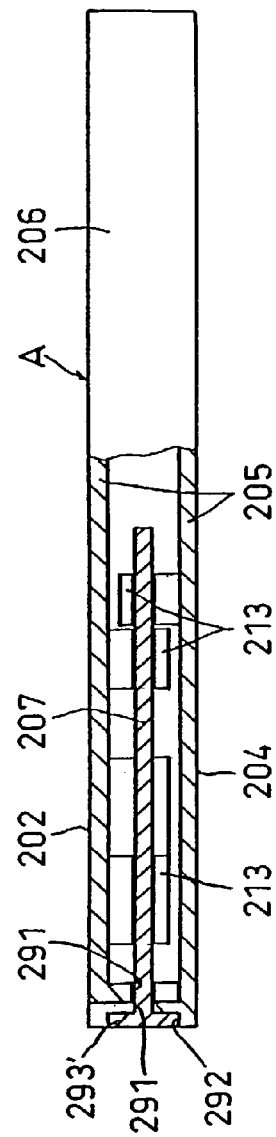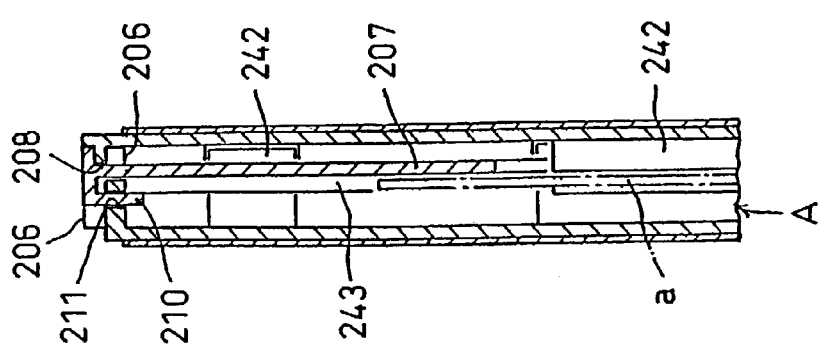

ANTITHEFT CASE

BACKGROUND OF THE INVENTION

1. Field of the Invention

The present invention relates to an antitheft device which protects commodities for rent or sale put in individual cases, such as audio or visual CDs and video tapes and game software, from being removed from the cases and out of a shop without permission, and which also protects the cases from being pried open by applying an excessive force thereto in an opening direction. The invention also relates to a case equipped with such a device.

2. Prior Art

In rental shops, as is well known, displaying rental commodities put in individual cases might stimulate some customers to steal them because of absence of measures to protect the cases from being opened.

Therefore, to prevent thefts, empty cases are displayed in a shop and when a Q customer brings an empty case to the counter, a clerk fetches a corresponding commodity from a storage place and rents it to him/her.

Adopting this system can protect rental commodities from being stolen because customers never have a chance of touching the commodities directly.

However, it is extremely troublesome for the clerk to locate rental commodities requested by the customer in the storage place and to keep the storage place well-ordered, which causes various problems such as hindering a smooth rental process and demanding a large storage place.

These problems could be solved by displaying rental commodities put in individual cases in a shop and making a customer take a desired rental commodity out of a case and bring it to the counter for a rental process.

However, this system might stimulate some customers to take rental commodities out of the cases and out of the shop without permission because they can directly touch rental commodities.

Such stealing could be further encouraged by a simple structure of a case for storing a commodity consisting of a box and a lid without any measure to prevent opening of the lid.

To prevent thefts, each rental commodity is attached with an antitheft tag in an arbitrary position, with the tag having a unique ID code without a main power supply. A predetermined high-frequency electromagnetic field is provided at a gate of a shop. When a customer leaves the shop through the gate with a rental commodity, a resonance circuit of the ID code resonates to transmit the unique ID code and detects a modulation of the high-frequency electromagnetic field so as to detect passing of the rental commodity. A clerk monitors whether the commodity is rented or removed without permission.

However, there is an inconvenience in that unless the ID code (tag) is shielded by any method during a rental process at the counter, commodities rented according to a predetermined procedure are also detected as having been removed without permission.

This requires a troublesome shielding process, and various goods necessary for shielding greatly increase cost.

The aforementioned problems are not restricted to rental commodities but hold true to various kinds of commodities for sale such as clothes, accessories, and daily necessities when they are attached with a tag to be protected from being stolen.

In order to solve these problems, Japanese Laid-open Patent Publication No. 2002-080086 (Publication date: Mar. 19, 2002) discloses an antitheft device in which a key member is designed to be inserted into a through hole formed on peripheral walls of a box and lid, of a case, which overlap each other on inner and outer peripheral edges of the box and the lid when the case is closed, and this inserted key member prevents the case from being opened and a commodity thereinside from being removed from the case.

The key member is attached with an antitheft tag for protecting the commodity from being removed from a shop with the case.

On a surface where the key member and the case oppose each other is provided a locking member which is pressed back when the key member is inserted and brought into an engagement relationship with the key member when insertion of the key member is completed. The engagement relationship between the locking member and the key member prevents the key member from being pulled out.

It goes without saying that release of the engagement relationship is performed by inserting a releasing tool of the shop and by pulling out the key member with the releasing tool.

In the antitheft device of this type, the surface where the inserted key member and the through hole of the case oppose each other forms a straight line.

This allows something with a flat tip such as a screw driver to be forced between straight surfaces and to be twisted until the case is damaged, or allows the screw driver tip to be pressed strongly onto the key member in a releasing direction.

The driver tip may damage the locking member in the engagement relationship with the key member, or release the engagement relationship.

This structure is responsible for theft of commodities put in cases.

Even a case shown in FIG. 9, which is composed of a box and a lid and is provided with a temporary locking member to prevent the lid from being opened, peripheral walls of the box and the lid are directly butted with each other, thereby allowing a tip of a screw driver to be forced into between these directly butted edges.

This allows the case to be opened by twisting the driver.

When a case composed of a box 101, a lid 102, and appropriate hinges is in a closed condition, an inner peripheral wall 103 of the box 101 and an outer peripheral wall 104 of the lid 102 overlap with each other inside and outside as shown in FIG. 22, and if an external pressure is applied to the box 101 and the lid 102 in a direction indicated by arrows shown in FIG. 23, then there is a phenomenon that the outer peripheral wall 104 bends outwardly.

This phenomenon becomes more serious as the external pressure is stronger.

As a result, a finger tip or a driver can be easily forced into a space formed inside the outer peripheral wall, thereby further bending the outer peripheral wall outwardly to finally open the case.

The case could be forcibly opened by pressing a finger tip into between the outer and inner peripheral walls after an external peripheral wall is bent outwardly, and by hooking this pressed finger tip on an open edge of an outer or inner peripheral wall and pulling it out.

SUMMARY OF THE INVENTION

Thus, the present invention has an objective of protecting a case from being opened without permission so as to prevent theft of a commodity in the case, and another objective of solving the aforementioned problems.

In order to solve the aforementioned problems, the present invention adopts an antitheft device comprising a case composed of a box having an opening from which to insert and extract a commodity, and a lid which opens and closes the opening via appropriate hinges. The case has a through hole formed on a position where peripheral edges of the box and the lid overlap with each other inside and outside or on a necessary position of peripheral walls which oppose each other, and a key member is inserted into the through hole in an extractable manner so as to prevent the case from being opened, wherein convex-concave portions are formed in such a manner as to be continuously engaged with each other in necessary regions on a surface where a peripheral edge of an end portion of the key member in an inserted condition opposes an open edge of the through hole.

It is also possible to adopt an antitheft case comprising a box having an opening from which to insert and extract a commodity, and a lid which opens and closes the opening via appropriate hinges, wherein convex-concave portions are formed in such a manner as to be continuously engaged with each other either on a surface where peripheral walls are butted with each other in an exposed manner while overlapping inside and outside at peripheral edges of the box and the lid, or on an open surface of an outer peripheral wall in predetermined regions on a surface of either one of the box and the lid.

It is also possible to adopt an antitheft case comprising a box having an opening from which to insert and extract a commodity, and a lid which opens and closes the opening via appropriate hinges, wherein holding-down structure is formed on predetermined regions on peripheral walls which overlap with each other inside and outside of the box and the lid of the antitheft case, with the holding-down structure preventing an open edge of the outer peripheral wall from being bent outward when an external pressure is applied onto a surface of the antitheft case from at least one direction.

It is also probable to adopt an antitheft case comprising a box having an opening from which to insert and extract a commodity, and a lid which opens and closes the opening via appropriate hinges, wherein convex-concave portions are formed on necessary regions on at lease one open edge of peripheral walls which overlap inside and outside of the box and the lid of the antitheft case, with the convex-concave portions being designed to cause pain in a finger when someone tries to pry them apart.

The present invention also adopts a case comprising a box having an opening from which to insert and extract a commodity, and a lid which opens and closes the opening via appropriate hinges, wherein a through portion is formed on one of necessary positions which overlap with each other inside and outside peripheral edges of the box and the lid. The through portion allows a key member to pass through it in an extractable manner and establish a latched relationship, and a collision prevention portion is formed on another necessary position in order to secure closing of the case by avoiding collision with the key member. A latch member is provided at an end of the key member with which to establish a latched relationship so as to prevent opening of the case at a time of completion of insertion of the key member.

It is also possible to adopt a case comprising a box having an opening from which to insert and extract a commodity, and a lid which opens and closes the opening via appropriate hinges, wherein a pair of collision prevention portions are formed on a necessary position on peripheral walls which overlap with each other or oppose each other inside and outside peripheral edges of the box and the lid, with the pair of collision prevention portions facing inward from an open edge of the peripheral walls. A latch member is provided at an end of the key member with which to establish a latched relationship so as to allow the key member to be inserted between the collision prevention portions in a detectable manner and to prevent opening of the case at a time of completion of insertion of the key member.

It is also possible that the case includes: bolt hooking portions which are dotted inside side edges of the box and the lid that are opposite to sides having the hinges, and which have bolt insertion portions arranged in series along side edges of the case when it is in a closed condition, with the through portion of the key member and the collision prevention portion being formed somewhere closer to the bolt hook portions on the peripheral walls between the hinges and the bolt hooking portions; and a bolt member formed on the key member, with the bolt member passing through all the bolt insertion portions aligned to make a latched condition when the key member has been inserted.

It is also possible that the case includes: bolt hooking portions which are dotted inside side edges of the box and the lid that are opposite to the sides having the hinges, and which have bolt insertion portions arranged in series along the side edges of the case when it is in a closed condition; a passing collision prevention portion of the key member being formed somewhere closer to the bolt hook portions on the peripheral walls between the hinges and the bolt hooking portions; and a bolt member formed on the key member, with the bolt member passing through all the bolt insertion portions aligned to make a latched condition when the key member has been inserted.

The present invention also adopts a case comprising a box having an opening from which to insert and extract a commodity, and a lid which opens and closes the opening via appropriate hinges, wherein bolt hooking portions are dotted inside edges of sides of the box and the lid that can be opened and closed, and which have bolt insertion portions aligned along side edges of the case when the case is in a closed condition; a through portion is formed to allow a key member pass through it and be inserted in an extractable manner into peripheral walls between the hinges and side edges that can be opened and closed; and a bolt member which passes through all the bolt insertion portions aligned to make a latched condition when the key member has been inserted.

Embodiments of the present invention will be described as follows, based on the attached drawings.

BRIEF DESCRIPTION OF THE DRAWINGS

FIG. 2 is a perspective view showing a key member and a case.

FIG. 3 is a vertical cross-sectional view of the case where the key member has been inserted.

FIG. 4 is a horizontal cross-sectional plan view of the case when the key has been inserted.

FIG. 5 is a perspective view showing a main part of the case.

FIG. 7 is a vertical cross-sectional view showing use of the releasing tool.

FIG. 8 is another vertical cross-sectional view showing use of the releasing tool.

FIG. 9 is a perspective view showing Embodiment 2.

FIG. 10 is a vertical cross-sectional view of Embodiment 2.

FIG. 11 is a magnified plan view showing a main part of Embodiment 2.

FIG. 12 is a perspective view showing an example of convex-concave portions.

FIG. 13 is a perspective view showing another example of the convex-concave portions.

FIG. 20 is a perspective view showing Embodiment 4 of the present invention.

FIG. 25 is a vertical cross-sectional view showing a main part of Embodiment 5.

FIG. 28 is a vertical cross-sectional view showing a main part of the latch member.

FIG. 37 is a partial front view of a case where the key member has been inserted.

FIG. 38 is a horizontal cross-sectional plan view of the case where the key member has been inserted.

FIG. 39 is a horizontal cross-sectional view of the case where the key member has been inserted.

FIG. 46 is a horizontal cross-sectional plan view of the case of FIG. 45 where the key member has been inserted.

DETAILED DESCRIPTION OF THE PREFERRED EMBODIMENTS

Figure 1:
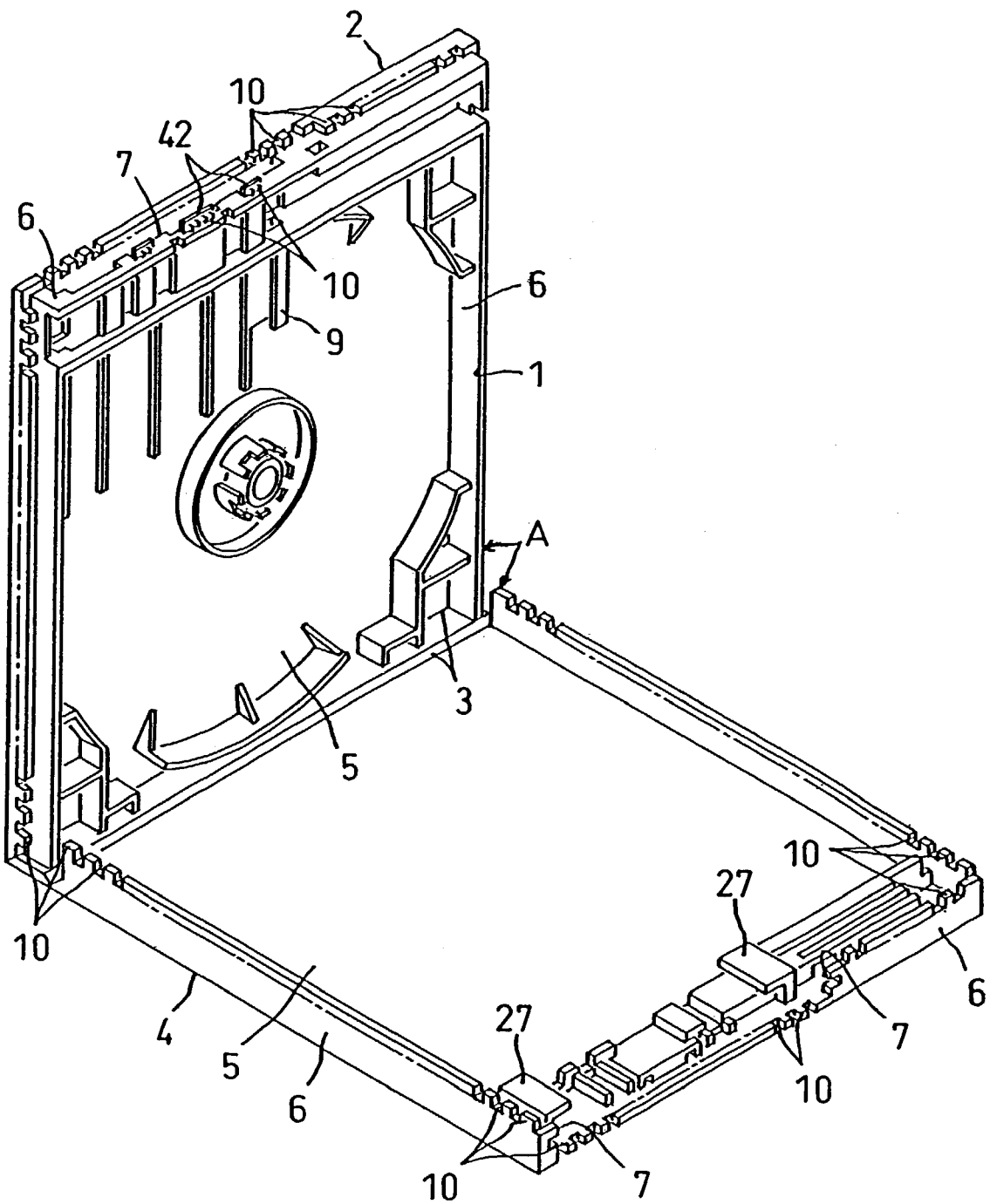
FIG. 1 is a perspective view showing Embodiment 1.

In Embodiment 1 of the present invention, as shown in FIGS. 1 to 5, a case "A" is composed of a box 2 having an opening 1 through which to insert or to extract a commodity "a", and a lid 4 for opening and closing the opening 1 via appropriate hinges 3. The box 2 and the lid 4 have respective main walls 5, 5 integrated with peripheral walls 6, 6 which overlap or oppose each other inside and outside.

The hinges 3 include a half-cut hinge provided on a bottom side of the peripheral wall 6 of the box 2 in order to connect the bottom side with the main wall 5 of the lid 4, so as to separate, for example, both ends of the bottom side of the peripheral wall 6 of the box 2 from bottom edges of both sides of the peripheral wall 6, and also include a half-cut hinge provided on a border of the bottom side of the peripheral wall 6 and the main wall 5 of the box 2 so as to open the box 2 and the lid 4 flat. This is not the only structure allowable and the case can be opened by using separate hinges or pin hinges composed of holes and an axle.

On predetermined positions of the peripheral walls 6, 6 of the box 2 and the lid 4 are provided through holes 7, 7 into which a key member 8 is inserted in an extractable manner so as to protect the case from being opened.

As shown in FIG. 2 the through holes 7, 7 formed on the peripheral walls 6, 6 are composed of long holes formed on inner peripheral wall 6; cuttings formed from an open edge of outer peripheral wall 6 towards the main wall 5 of the lid 4; and an L-shaped latch piece 27 provided to guide insertion of the key member 8 through inside the main wall 5 of the lid 4 and to hold both side edges of the key member 8.

Commodity "a", such as a disk or another article for rent or sale, put in the case "A" in which the key member has been thus inserted cannot be removed, thereby preventing stealing of the commodity.

The key member 8 is not restricted to being plate-shaped as illustrated, but can be angular, for example.

In short, it is essential to protect the lid 4 from being opened from the box 2 by inserting the key member 8 into the through holes 7, 7.

It is also possible to provide the through holes 7,7 on edges where both peripheral walls 6,6 oppose each other or on butted edges of projecting walls that project from the main wall 5, other than top-side peripheral walls 6 overlapping each other inside and outside.

As shown in FIG. 3, guide structure 9 of the key member 8 can be provided between inner surfaces of the main walls 5 of the box 2 and the lid 4 so as to allow the key member 8 be inserted or and extracted smoothly.

Furthermore, continuous convex-concave portions 10 to be engaged with each other are provided on necessary regions on a surface where a peripheral edge of a side of the key member 8 opposite to its insertion direction opposes an open edge of through hole 7.

Because of provision of the continuous convex-concave portions 10, as shown in FIG. 5, even when a tip of a tool K such as a screw driver is tried to be forced into engaged regions between the through hole 7 and the key member 8, the tip of the tool K is hooked by convex-concave edges of the convex-concave portions 10. As a result, the engaged regions are protected from being pried open and damaged when the tool K is stuck and twisted into the peripheral wall 6, thereby protecting the case "A" from being forcibly opened.

Sticking of the tool K into the engaged regions can be prevented more effectively by making a length of projection of the convex-concave portions 10, depth of concaves, and widths of the concaves and convexes smaller than a length of a flat and sharp edge of the tool K.

Figure 14:
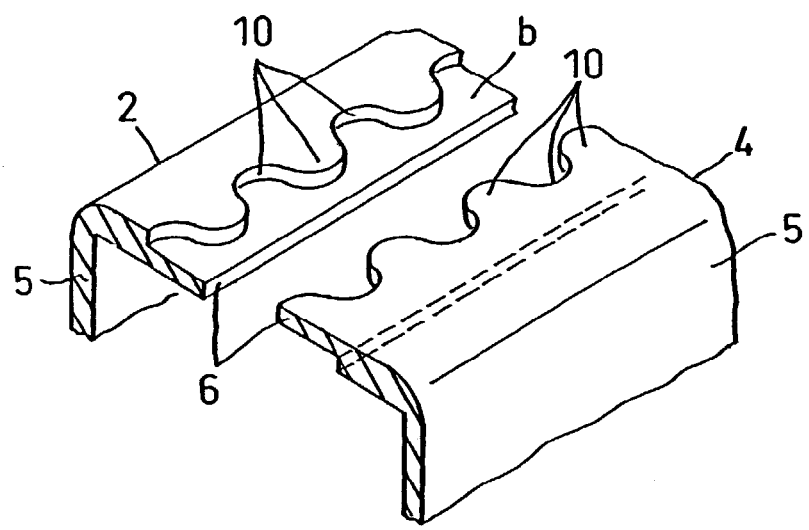
FIG. 14 is a perspective view showing further another example of the convex-concave portions.

It is obvious that the shape of the convex-concave portions 10 is not restricted to the one shown in FIG. 5 but can be saw-teeth shown in FIG. 13 or a waveform shown in FIG. 14.

Figure 15:
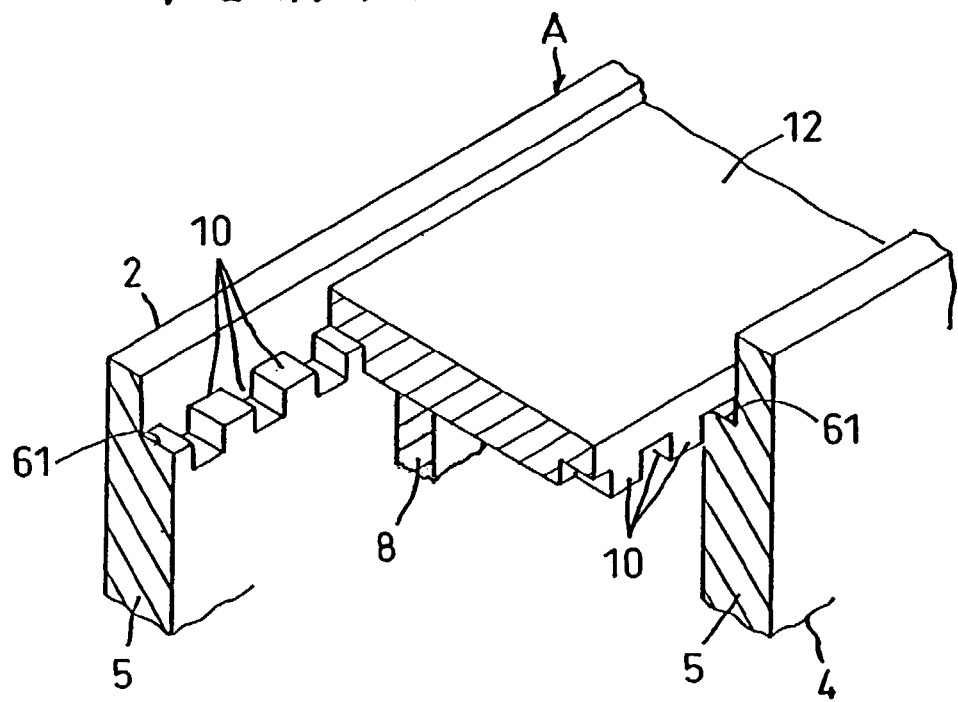
FIG. 15 is a partial perspective view showing further another example of the convex-concave portions.

It is possible to form the convex-concave portions 10 on a plate surface of the key member 8, the edge of the through hole 7, the key member 8 and the main wall 5 of the case "A", for example, as shown in FIG. 15, or both on a top surface of step portion 61 which is lowered from the through hole 7 inside the main wall 5 of the case "A" and a bottom surface of the step portion 61 which is laid on the top surface when the end of the key member 8 is fitted into the step portion 61.

The key member 8 can be provided with an antitheft tag 11 via adhesive such as glue as shown in FIG. 2, or via an embedding tool used for molding.

As is well known, the tag 11 has a unique ID code without a main power supply. When a customer passes through a gate of a shop with the case "A" into which the key member 8 with the tag 11 has been inserted, a resonance circuit of the ID code resonates to transmit the unique ID code. A high-frequency electromagnetic field is modulated to detect this passing of the case "A".

A clerk of the shop monitors whether or not it is removed without permission so as to protect the commodity "a" from being stolen with the case "A".

The following is a description of returning of the key member 8 into the shop and a manner for engaging inserted key member 8 with the case "A".

As shown in FIG. 2, a flange 12 is provided at an end of the key member 8 in such a manner as to be fitted into the through hole 7 when the key member 8 is completely inserted, and the convex-concave portions 10 are formed on both the flange 12 and the through hole 7.

The flange 12 is designed to project from both plate surfaces of the key member 8 and side edges of plate surfaces; however, it could be designed to project exclusively from one plate surface of the key member 8.

It would be possible to form the convex-concave portions 10 on a plate surface of a key member 8 that has no flange 12.

Since the flange 12 has a large width, a width between the main wall 5 of the through hole 7 of the outer peripheral wall 6 and the opening of the lid 4 can be so designed to fit the flange 12 therein when the through hole 7 is a long hole, whereas when the through hole 7 is the above-mentioned cutting, the flange 12 can be fitted into the cutting.

On a surface where the case "A" and the key member 8 oppose each other, to be more specific, on the inner surface of the main wall 5 of the box 2 and on the plate surface of the key member 8 shown in FIG. 2, are provided locking structure B which is pressed back when the key member 8 is inserted, and is automatically brought into an engagement relationship at a time of completion of insertion.

Figure 6:
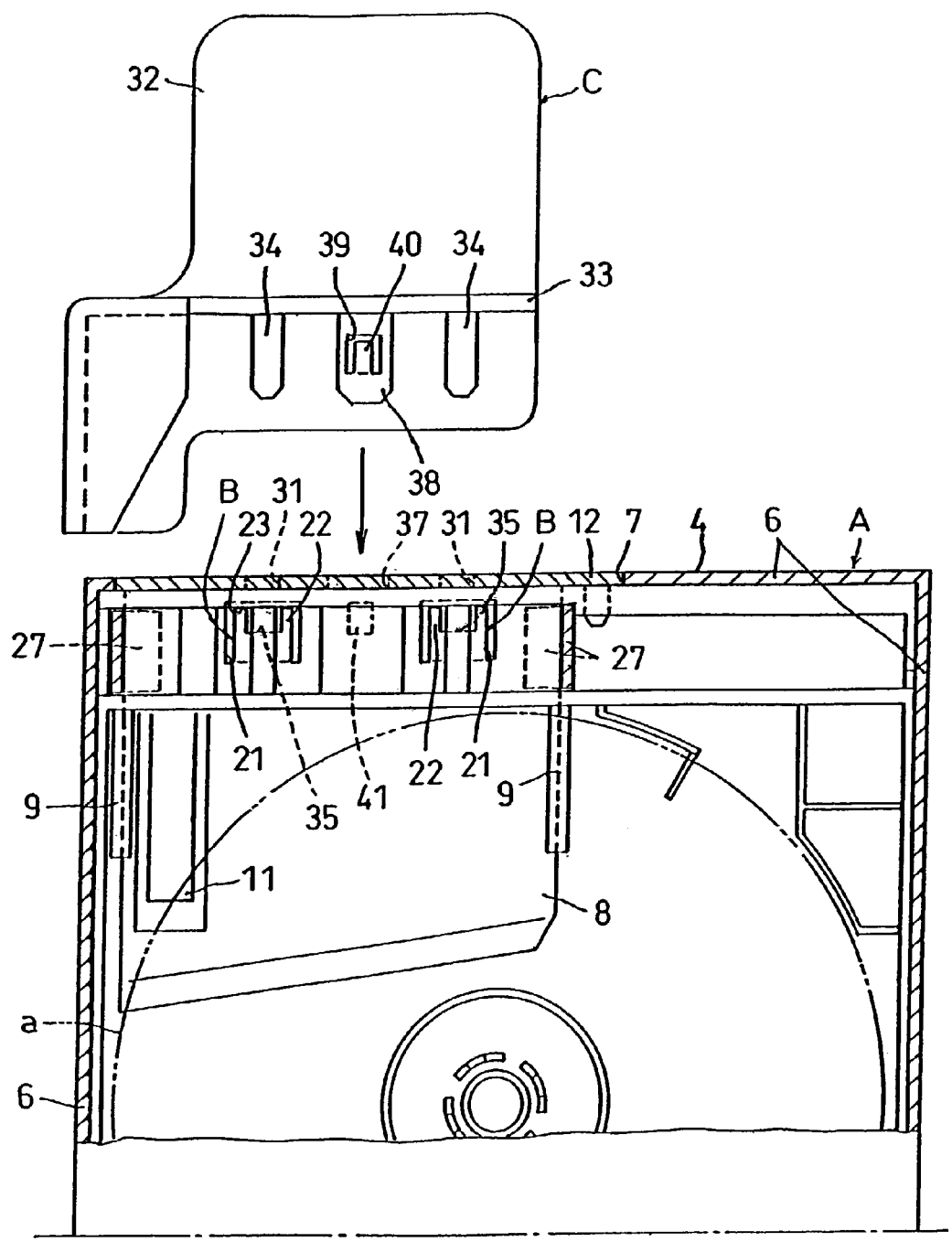
FIG. 6 is a partial front view showing use of a releasing tool.

As shown in FIGS. 2, 3, and 6, the locking structure B is composed of inverted U-shaped slits 21 which are formed on the plate surface of the key member 8 in such a manner that insides of the slits 21 project towards the main wall 5 of the lid 4; locking hooks 22 which obtain strength of stability from a property of a synthetic resin from which the key member 8 is made; and the inner surface of the inner peripheral wall 6 as an engaging section 23 which presses back the locking hooks 22 by the edge of the through hole 7 immediately before completion of insertion of the key member 8 and with which an end of the locking hooks 22 in a projection direction is engaged when the locking hooks 22 are freed from being pressed back at completion of the insertion of the key member 8. Other than this structure, separate locking hooks could be glued to the key member 8, or the engaging section 23 could be provided on the main wall 5 of the box 2 in the form of a projection.

A number of the locking hooks 22 is not limited to two to be formed on the left and the right in FIG. 2, but can be determined freely. It is also possible to provide the engaging section 23 on the lid 4 side.

After the opening 1 of the box 2 is closed by the lid 4, the key member 8 is inserted into coincided through holes 7, 7.

In response to this insertion of the key member 8, the locking hooks 22 are pressed back by the edge of the through hole 7, and as a result of completion of engagement of the through hole 7 on outer peripheral edge of wall 6, that is, as a result of the key member 8 passing through the through hole 7, the locking hooks 22 released from the edge of the through hole 7 are restored and hooked by the engaging section 23, thereby bringing the engaging section 23 and the locking hooks 22 into the engagement relationship as shown in FIG. 3.

This engagement prevents the key member 8 from being pulled out by someone other than the clerk of the shop, thereby protecting the commodity "a" in the case "A" from being stolen.

The following is a description of removal of the key member 8 from the case "A" by the clerk with a releasing tool C.

As shown in FIGS. 6, 7, and 8, the releasing tool C, which includes projecting pieces 34, a plate 33, and a grip 32, is positioned right above the locking hooks 22 of the flange 12, and the projecting pieces 34 are stuck into the long hole 31 of the key member 8.

These stuck projecting pieces 34, when passing through the cuttings 35 that face inward from central portions of the ends of the locking hooks 22 in the projection direction, are pressed back by contact between bottom edges of the cuttings 35 and a tapered surface 36 provided on the projecting pieces 34 on the locking hooks 22 side.

Engagement between the locking hooks 22 and the engaging section 23 shown in FIG. 3 is released by the locking hooks 22 being detached from the engaging section 23 as shown in FIG. 7. Therefore, the key member 8 can be removed by pulling the releasing tool C in a direction indicated by the arrow shown in FIG. 8.

Since the locking hooks 22 are pressed against the projecting pieces 34 by strength of stability which affects the locking hooks 22 being pressed back as a result of release of engagement of the locking hooks 22, friction due to this pressing enables the key member 8 to be pulled out together with the releasing tool C.

To secure this removal, as shown in FIG. 8, a through window 37 coinciding with the through hole 7 is provided next to the long hole 31 of the flange 12, and a protruding piece 38 that projects from the plate 33 is stuck into the through window 37 and the through hole 7.

An inverted U-shaped slit 39 is provided in the protruding piece 38, and an inside of the slit 39 is made to project to the key member 8 side for the same function as the locking hooks 22 so as to provide a hooking piece 40.

The key member 8 and the like are provided with a latch section 41 having a concave or a through hole into which a tip of the hooking piece 40 in a projection direction is fitted when the protruding piece 38 has been completely stuck.

It is beyond question that the hooking piece 40 can be formed on the key member 8, and the latch section 41 can be formed on the protruding piece 38.

The hooking piece 40 which comes into contact with the key member 8 while the protruding piece 38 is being stuck is pressed back, which makes the hooking piece 40 and the latch section 41 be coincided with each other at a time of releasing engagement of the locking hooks 22 and the engaging section 23. As a result, the hooking piece 40 freed from being pressed back is returned and engaged with the latch section 41 as shown in FIG. 8.

When the releasing tool C is pulled out, the key member 8 is also pulled out without fail.

The key member 8 thus pulled out is kept in the shop for reuse and the case "A" from which the key member 8 has been pulled is used to encase a commodity for rent or sale.

It goes without saying that no shield is necessary for the case "A" because it does not have the key member 8 with the tag 11.

As shown in FIGS. 1, 2, and 5, pieces 42 projecting from peripheral wall 6 are fitted into side edges of the long hole 31 or the through window 37, and the above-described convex-concave portions 10 are formed on a surface where the pieces 42 oppose open edges of the long hole 31 or the through window 37 in such as manner as to be engaged with each other so as to prevent insertion of the tool K.

The releasing tool C includes the projecting pieces 34, which release the engagement relationship, and the protruding piece 38 having the hooking piece 40 to prevent removal of the key member 8. However, when the locking structure B is not provided for the case "A" and the key member 8, the key member 8 can be designed to be pulled out by a special removal tool (not illustrated) having a projecting piece with a hooking piece.

It is obvious that when the pieces 42 are fitted in the long hole 31 or the through window 37, a space is left to allow the projecting pieces 34 and the protruding piece 38 to be passed through.

In Embodiment 2 of the present invention, in case "A" including box 2, shown in FIGS. 9–11 and FIGS. 1 and 2 of Embodiment 1, and lid 4 with hinges 3 for opening and closing opening 1 of the box 2, continuous convex-concave portions 10 are provided in predetermined regions on a surface where peripheral walls abut each other in an exposed manner inside and outside of the case "A" or on a surface where the opening 1 (open surface) of outer peripheral wall 6 opposes either the box 2 or the lid 4.

Although the convex-concave portions 10 are provided on the peripheral walls 6 not having the hinges 3 in Embodiments 1 and 2, they could be provided on a desired peripheral wall 6.

The convex-concave portions 10 can be formed at an opening portion of the peripheral walls 6, 6 where a step "b" is formed as shown in FIGS. 11 and 12 so as to make the peripheral walls 6, 6 of the box 2 and the lid 4 form a planar surface in Embodiment 2.

In Embodiment 1, the convex-concave portions 10 are formed on an open edge surface of the outer peripheral wall 6 and a rear surface of a side of main wall 5.

The convex-concave portions 10 could be shaped like saw-teeth or a waveform (shown in FIGS. 13 and 14) as described in Embodiment 1.

Even if it is tried to pry open the case "A" by sticking a tool in the same manner as with Embodiment 1, the convex-concave portions 10 engaged with each other prevent it.

Reference numeral 51 in FIG. 11 indicates a latch structure, which is of a bullet-splash type and is a combination of a concave portion and a projecting portion to be engaged with each other.

Figure 16:
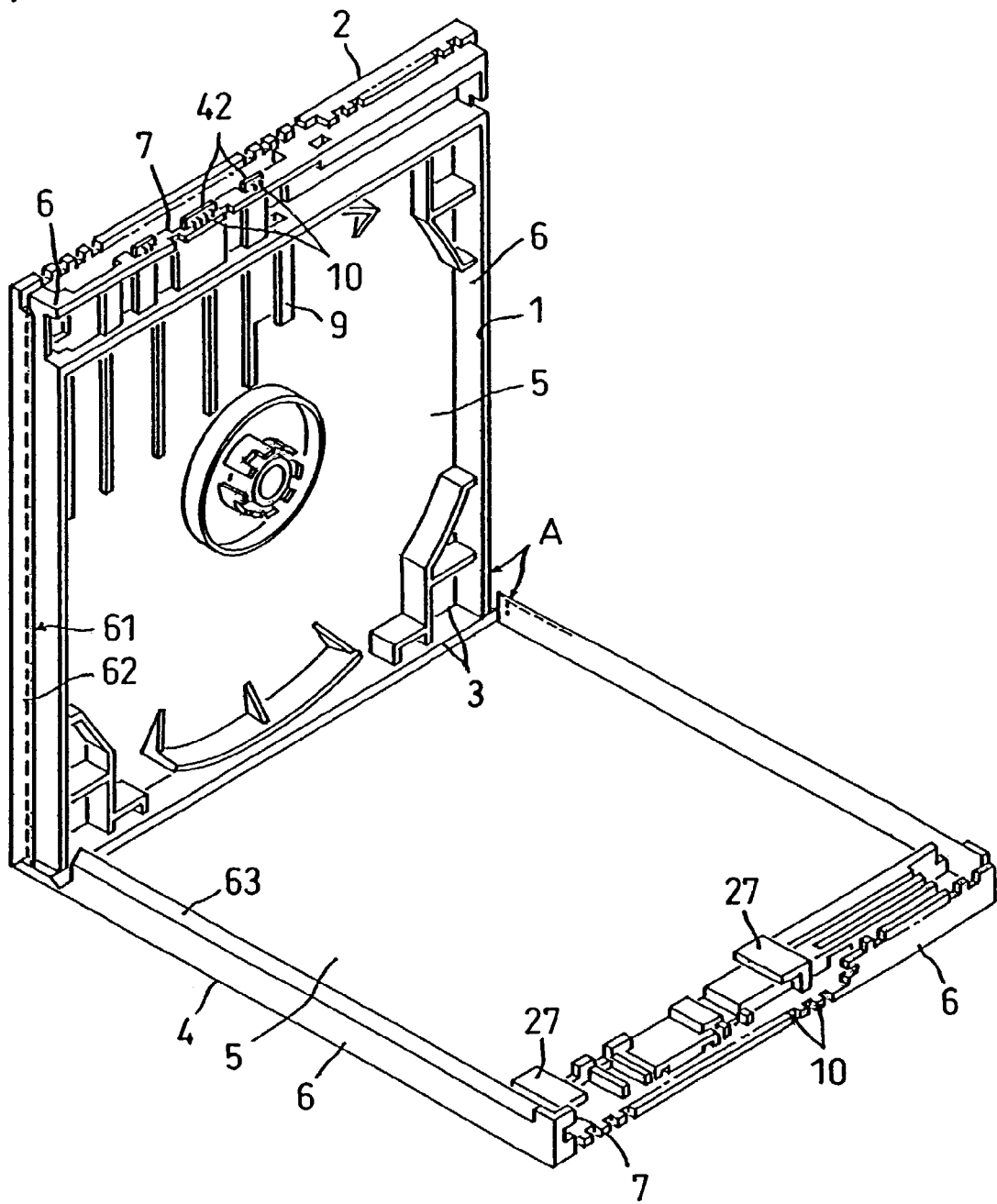
FIG. 16 is a perspective view showing a case of Embodiment 3.
Figure 17:
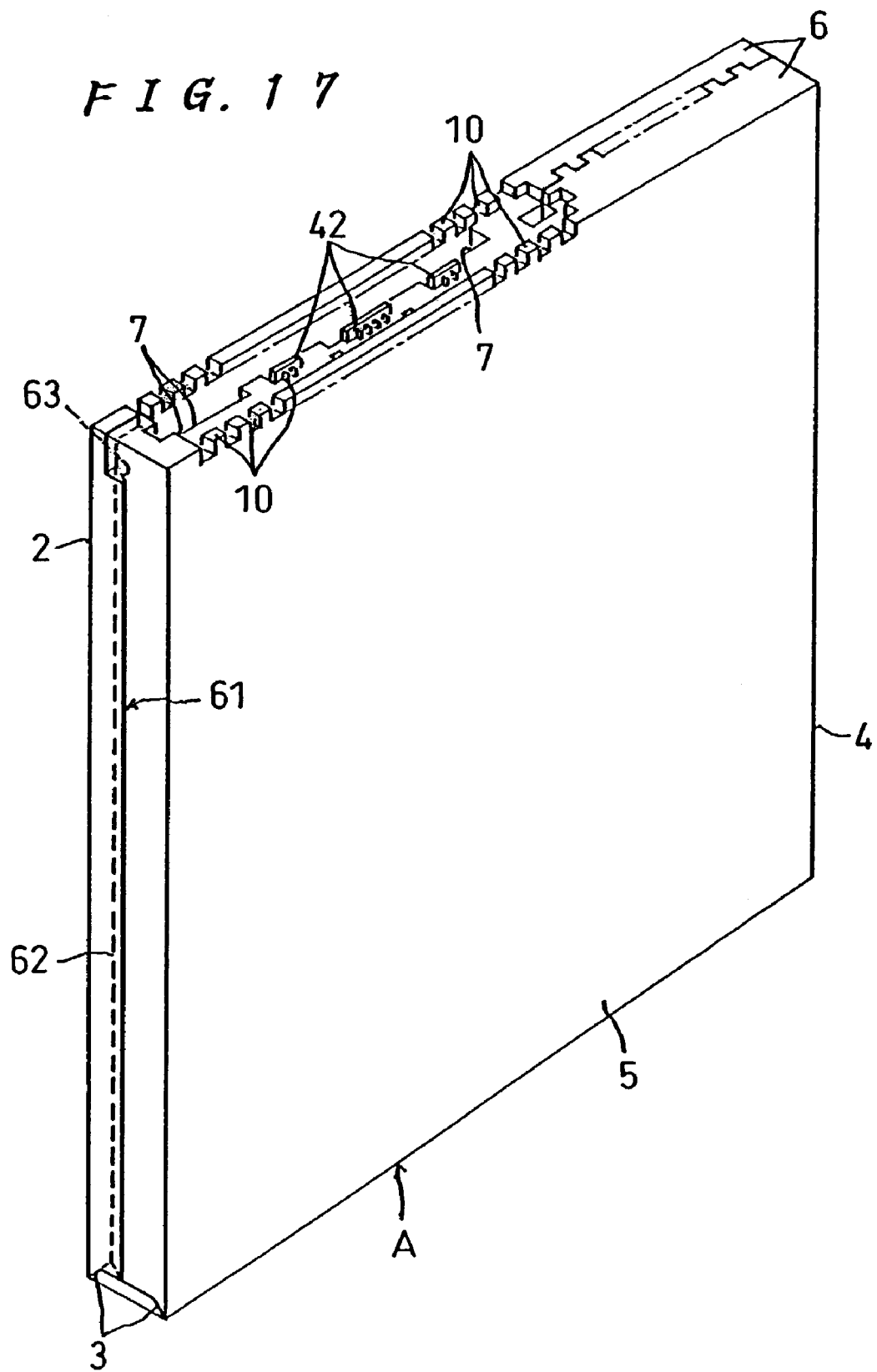
FIG. 17 is a perspective view showing the case of Embodiment 3 when closed.

In Embodiment 3 of the present invention, as shown in FIGS. 16 and 17, case "A" is composed of box 2 and lid 4 for opening and closing opening 1 of the box 2 via hinges 3 attached to the box 2.

Figure 18:
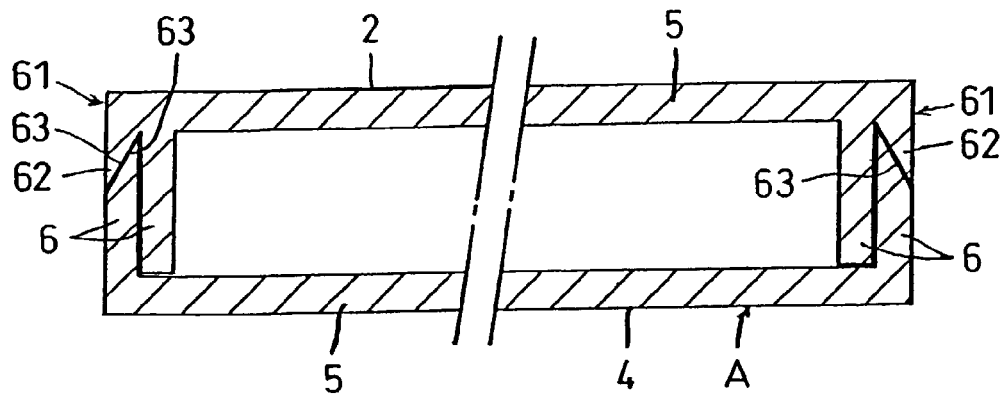
FIG. 18 is a horizontal cross-sectional plan view showing a main part of the case of Embodiment 3.
Figure 19:
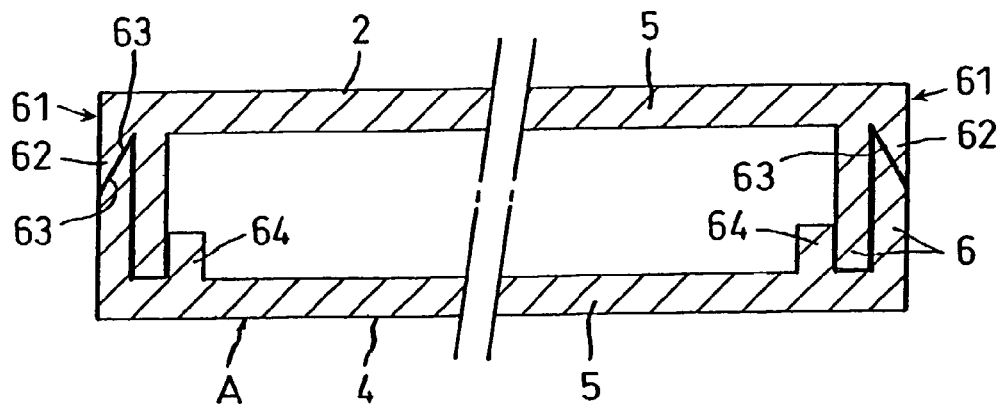
FIG. 19 is a horizontal cross-sectional plan view showing a main part of another example.
Figure 21:
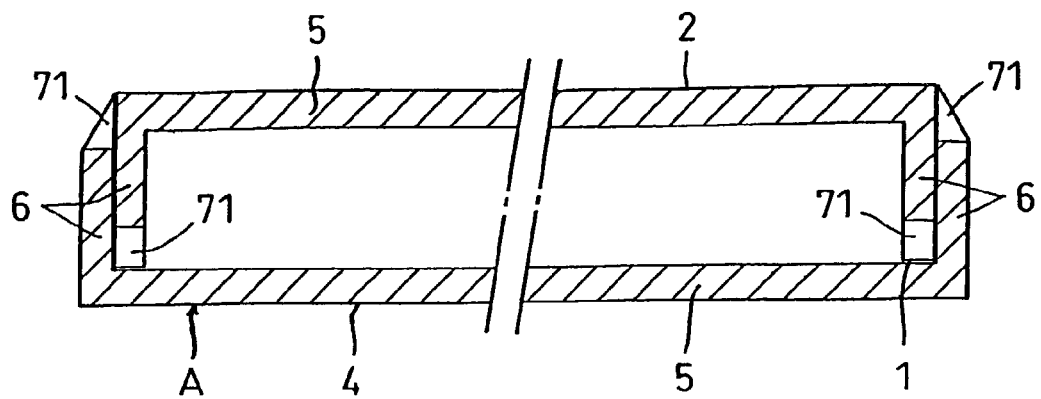
FIG. 21 is a horizontal cross-sectional plan view showing a main part of Embodiment 4.
Figure 22:
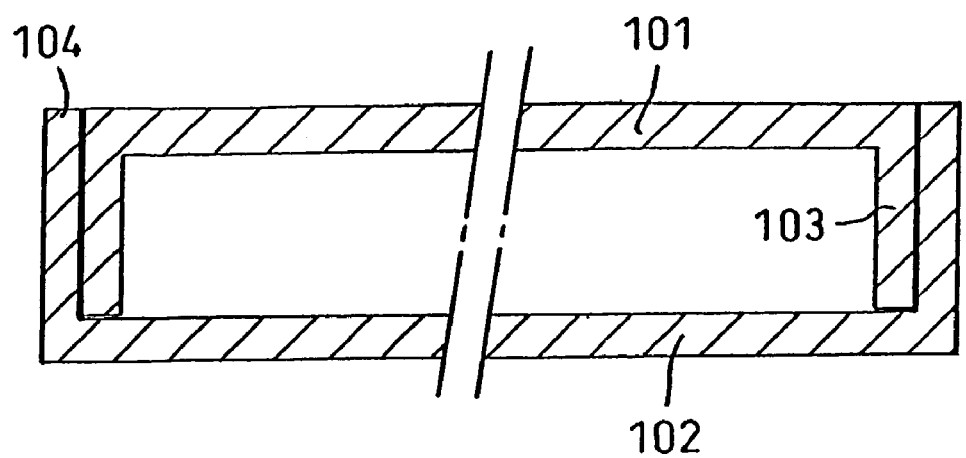
FIG. 22 is a horizontal cross-sectional plan view showing a conventional case.
Figure 23:
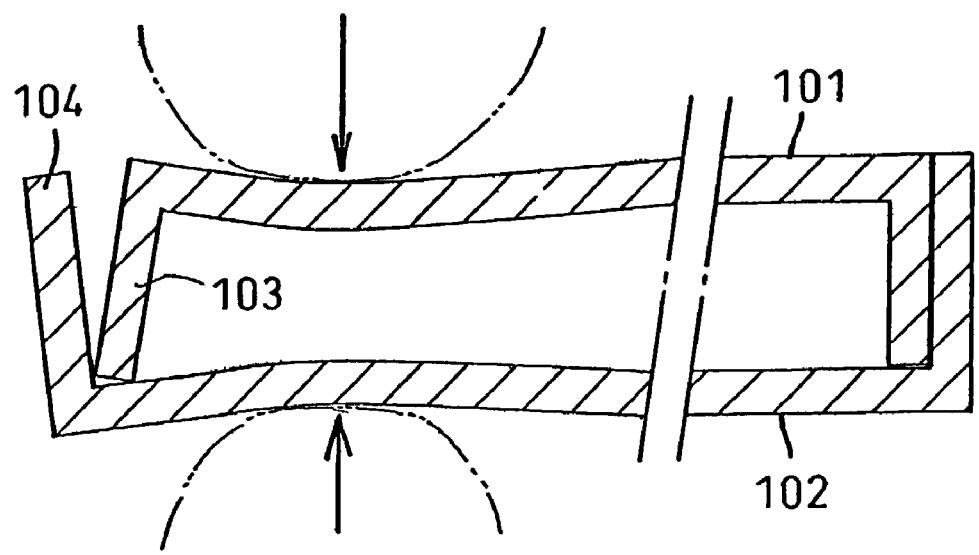
FIG. 23 is a horizontal cross-sectional plan view when an external force is applied to the conventional case.
Figure 24:
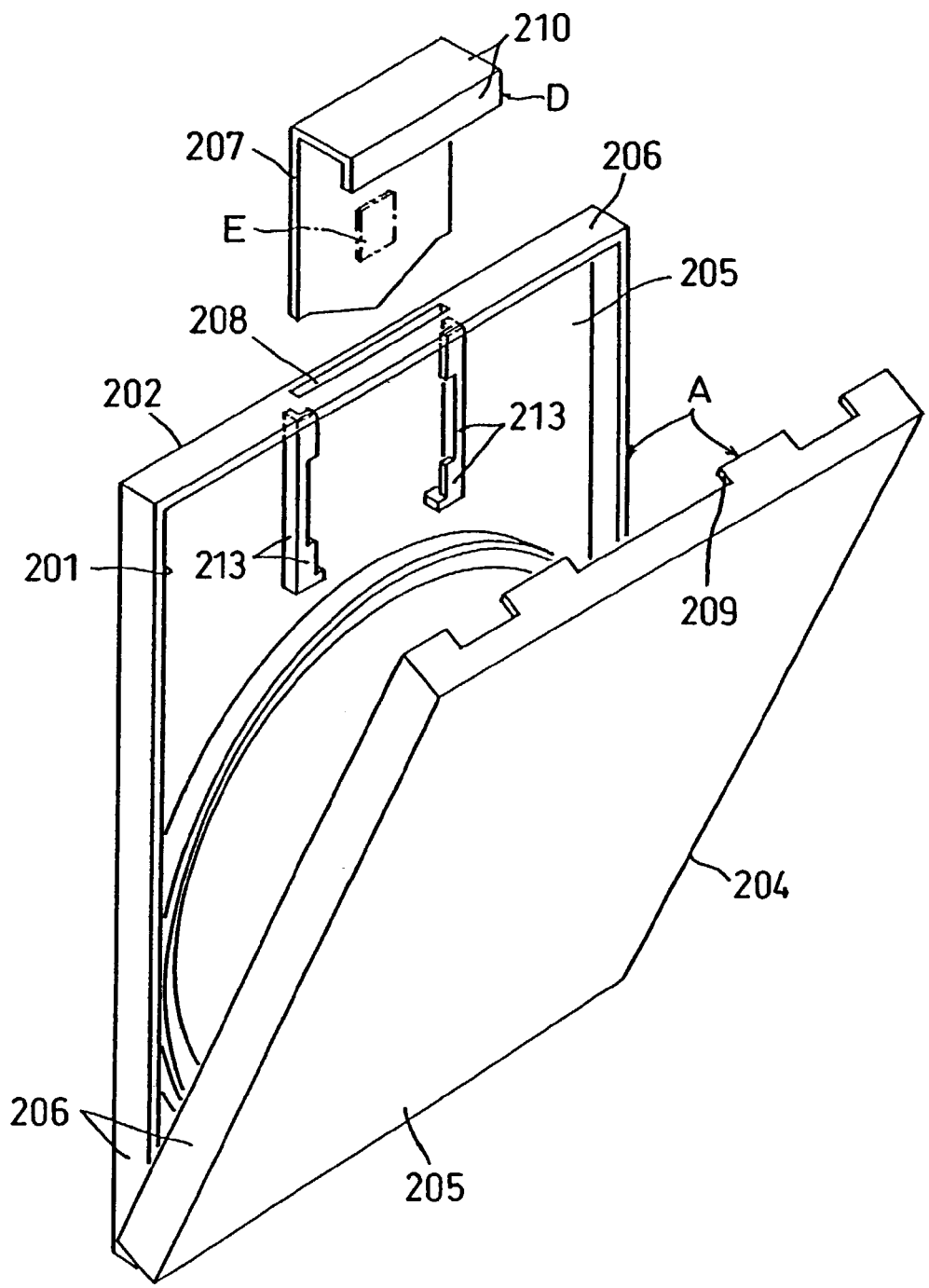
FIG. 24 is a perspective view showing Embodiment 5.
Figure 26:
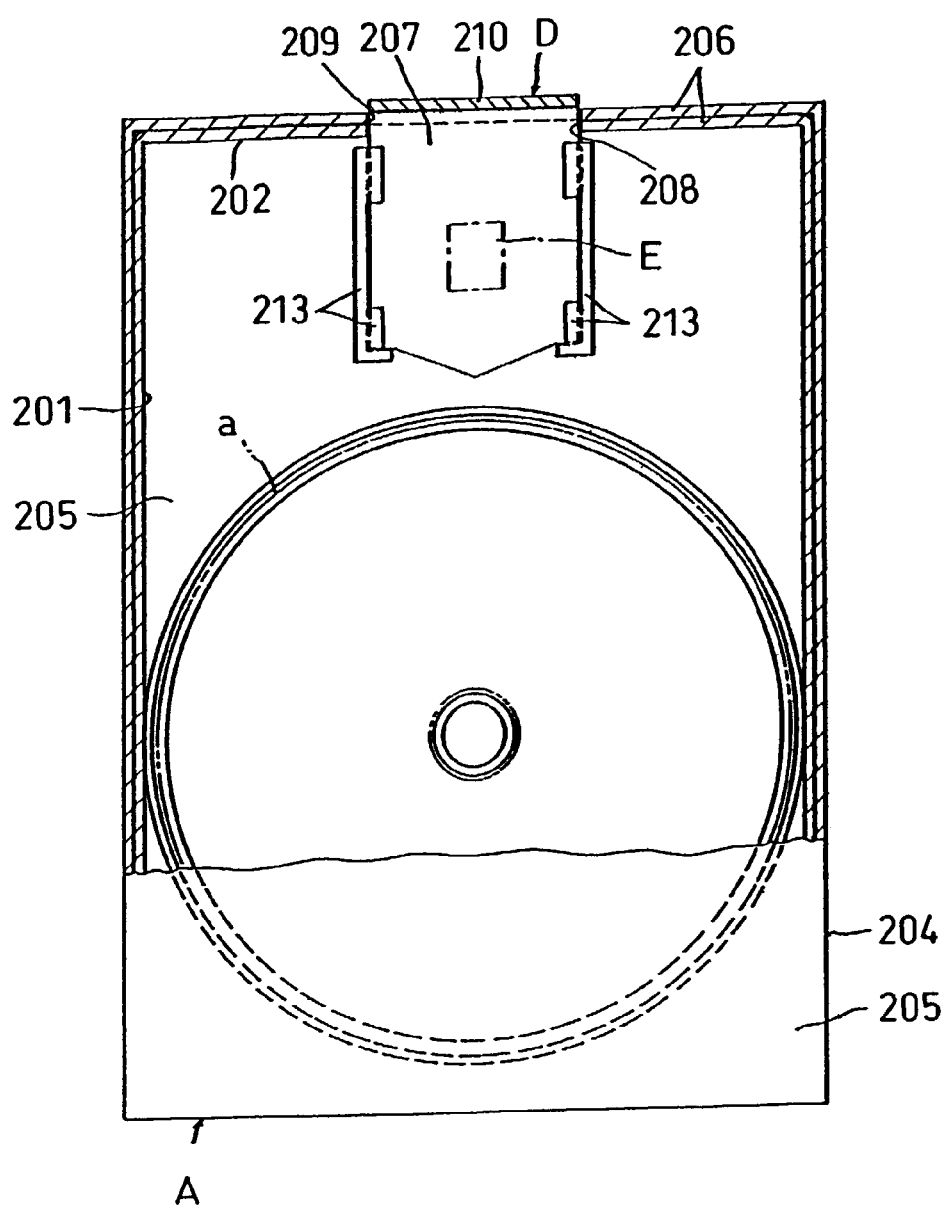
FIG. 26 is a partial front view showing a main part of Embodiment 5.

As shown in FIGS. 18, 19, and 21, there is holding-down structure 61 provided on necessary regions on the peripheral walls 6, 6 overlapping inside and outside of the box 2 and the lid 4 of the case "A". The holding-down structure 61 prevents open edges of outer peripheral wall 6 from being bent outwardly when an external pressure is applied inwardly from at least one direction onto a surface where main walls 5, 5 of the box 2 and the lid 4 of the case "A" oppose each other.

Since the box 2, the lid 4, and the hinges 3 are the same as those in Embodiment 1, their description will be omitted.

Similar to Embodiment 1, the case "A" is provided with through holes 7,7 on both peripheral walls 6, 6 opposing the hinges 3, and a key member 8 is inserted into the through holes 7, 7 to protect a commodity in the case "A" from being stolen.

The through holes 7, 7, the key member 8, and locking structure B for preventing removal of inserted key member 8 by someone other than the shop clerk are the same as in Embodiment 1, and extraction of the key member 8 by the shop clerk with use of releasing tool C will be performed in the same manner as in Embodiment 1.

It goes without saying that using the key member 8 in Embodiment 3 of the present invention is not the only member available for protecting the commodity in the case "A" from being stolen, and other manners could be employed.

As shown in FIG. 18, the holding-down structure 61 is formed in order to protect open edges of the outer peripheral wall 6 from being bent outwardly by an external pressure, and is provided with projecting portions 62 which are integrated with and projected from the main wall 5 integrated with the inner peripheral wall 6 towards the open edges of the outer peripheral wall 6. In addition, tapered surface portions 63 are provided in such a manner as to overlap with each other on surfaces where the open edges of the outer peripheral wall 6 and projecting portions 62 oppose each other. Of these overlapping tapered surface portions, outside tapered surface portions 63 of the projecting portions 62 are designed to press the inside tapered surface portions 63 of the outer peripheral wall 6; however, the tapered surface portions 63 can be replaced by a nest in which ridge portions are engaged inside and outside on the surfaces.

It is more effective in order to achieve the objective of the present invention that ridge portions 64 are provided in parallel on the outer peripheral wall 6, and that the inner peripheral wall 6 is fitted between the outer peripheral wall 6 and the ridge portions 64 as shown in FIG. 19.

According to the above-described structure, the holding-down structure 61 can prevent overlapping peripheral walls 6, 6 from being bent towards outside the outer peripheral walls 6, even if an external pressure is applied to the case "A".

Although the holding-down structure 61 is provided exclusively on two parallel sides not having the hinges 3 attached between the peripheral walls 6,6 nor the insertion holes 7,7 into which the key member 8 is inserted, it may be provided on a side having the through holes 7,7, besides the two sides.

In Embodiment 4 of the present invention, as shown in FIGS. 20 and 21, case "A" is composed of box 2 and lid 4 for opening and closing opening 1 of the box 2 via hinges 3.

Convex-concave portions 71, which are shaped to cause pain on a finger when it is stuck thereto, are provided on necessary regions of at least one open edge of peripheral walls 6, 6 of the box 2 and the lid 4 which overlap inside and outside of the case "A".

The convex-concave portions 71 are in the form of saw-teeth in this illustrated example, so when someone hooks a finger at the open edge of peripheral wall 6 and applies too much force to the peripheral wall 6 in a direction of opening, the convex-concave portions 71 bite into the finger to hurt it, thereby dissuading him/her from applying further force. The convex-concave portions 71 could be other than saw-teeth as long as they are designed to bite into a finger.

The convex-concave portions 71 in the illustrated example are provided on the open edges of both peripheral walls 6,6; however, they could be exclusively provided on an open edge of one peripheral wall 6, that is, either outer peripheral wall 6 or inner peripheral wall 6. It is also possible to additionally provide the holding-down structure 61 of Embodiment 3.

Since the box 2, the hinges 3, and the lid 4 composing the case "A" are the same as those in Embodiment 1, their description will be omitted.

In the same manner as Embodiment 1, the case "A" is provided with through holes 7,7 formed on a side of both peripheral walls 6, 6 that opposes the hinges 3, and a key member 8 can be inserted into the through holes 7, 7 to prevent theft of a commodity put in the case "A".

The through holes 7, 7, the key member 8, locking structure B for preventing removal of inserted key member 8 by someone other than the shop clerk are the same as in Embodiment 1, and extraction of the key member 8 by the shop clerk with use of releasing tool C will not be explained because it is performed in the same manner as in Embodiment 1.

It is obvious that using the key member in Embodiment 4 of the present invention is not the only manner available for protecting the commodity in the case "A" from being stolen, and other manners could be employed.

Although the convex-concave portions 71 are provided exclusively on the two parallel sides not having the hinges 3 nor the through holes 7,7 in the case "A", they may be provided on a side having the through holes 7,7, besides the two sides.

Case "A" used in Embodiment 5 of the present invention is composed of a box 202 having an opening 201 through which commodity "a" is inserted or extracted, and a lid 204 for opening and closing the opening 201 via appropriate hinges 203 is provided on the box 202.

The box 202 and the lid 204 are composed of a main wall 205 and a peripheral wall 206 which is integrated with peripheral edges of the main wall 205, and which projects in a direction of a rear surface of the main wall 205. The peripheral wall 206 of the lid 204 is designed to be fitted outside the peripheral wall 206 of the box 202; however, they could be fitted oppositely.

The hinges 203 in this illustrated example are composed of a half-cut hinge provided on a bottom side of the peripheral wall 206 of the box 202 in order to be connected with the main wall 205 of the lid 204. This is not the only structure allowable, and it is possible to employ, for example, hinges of an engagement type composed of an axle and holes.

A through portion 208 is provided in a necessary position on one of the peripheral walls 206, 206 overlapping inside and outside so that a key member 207 can be inserted therein in an extractable manner so as to establish a latched relationship. A collision prevention section 209 is provided on another peripheral wall 206 to prevent a collision with the key member 207 so as to secure a complete closing of the case "A".

The through portion 208 is provided on an inner peripheral wall 206 whereas the collision prevention section 209 is provided in the form of a cutting on an outer peripheral wall 206; however, it is also possible to provide the collision prevention section 209 on the inner peripheral wall 206 and to provide the through portion 208 on the outer peripheral wall 206. Although the through portion 208 is designed as a long hole to agree with an appearance of a plate-like shape of the key member 207, it could be another shape to agree with an appearance of the key member 207 when it is an axial member or the like. It is obvious that the collision prevention section 209 can be, e.g. U-shaped so that the key member 207 can be smoothly inserted thereinto.

At an end of the key member 207 is provided a latch member D which establishes a latched relationship with the box 202 or the lid 204 so as to prevent opening when insertion of the key member 207 has been completed.

Figure 27:
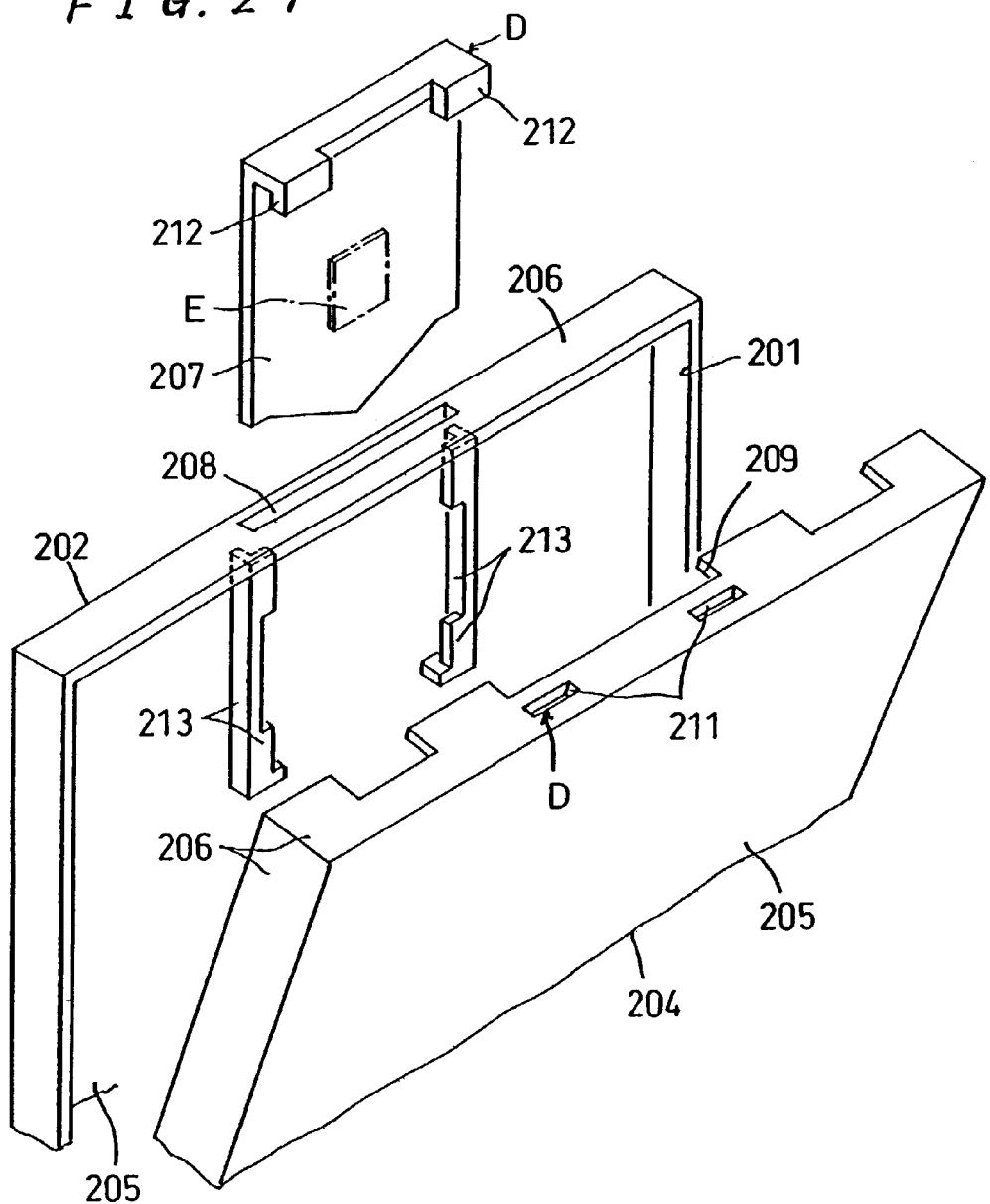
FIG. 27 is a perspective view showing another example of a latch member.

The latch member D is composed of, for example, an L-shaped holding piece 210 integrated with an edge of the key member 207, the holding piece 210 being designed to be outwardly in contact with the peripheral wall 206 and the main wall 205 of the lid 204. However, it is also possible to provide latch sections 211 in the form of through holes or concaves on the peripheral wall 206 having the collision prevention section 209 as shown in FIGS. 27 and 28, and to provide L-shaped projecting latch pieces 212 at the edge of the key member 207, thereby fitting tips of the projecting latch pieces 212 into the latch sections 211 when insertion of the key member 207 has been completed.

In short, it is essential to protect the case "A" from being opened by inserting the key member 207.

It is beyond question that the latch member D is not limited to the illustrated type.

A position of the latch member D is not limited to top-side peripheral wall 206 in FIGS. 24–28, and can be on the peripheral wall 206 on both sides. A position of the holding piece 210, the latch sections 211 and the projecting latch pieces 212 is not restricted to a middle of the peripheral wall 206; they can be positioned throughout the peripheral wall 206 or at both end corners. It is also possible to hold both corners by the holding piece 210.

Providing guide rails 213 inside the main wall 5 in order to guide both side edges of the key member 207 can make insertion of the key member 207 smooth.

Figure 29:
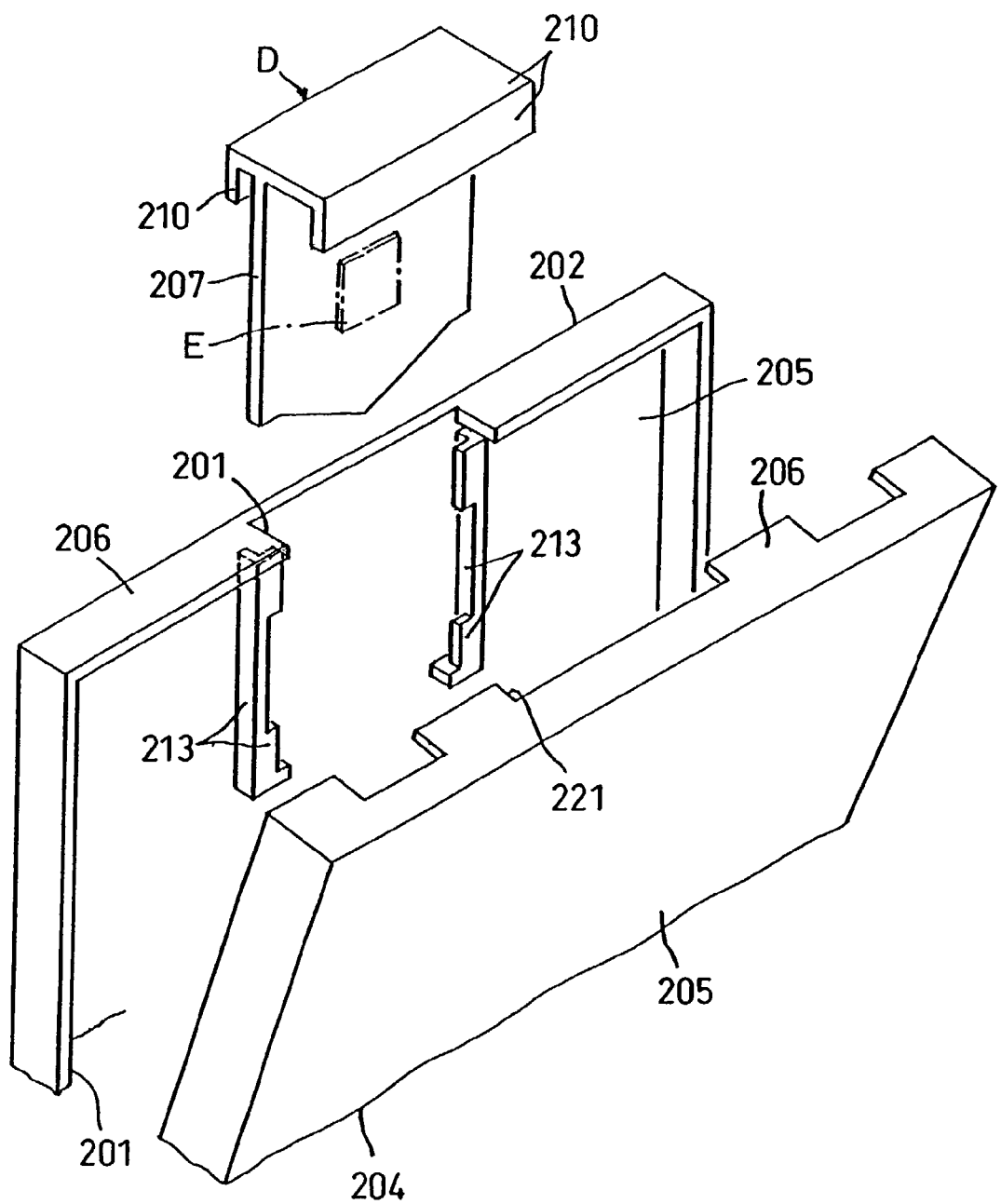
FIG. 29 is a perspective view showing Embodiment 6.
Figure 30:
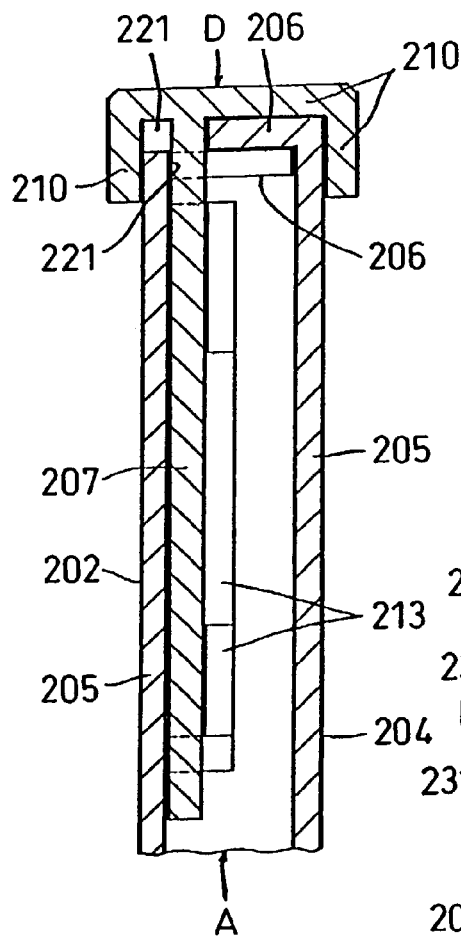
FIG. 30 is a vertical cross-sectional view showing a main part of Embodiment 6.

Embodiment 6 of the present invention is illustrated in FIGS. 29–33, and as shown in FIGS. 29 and 30, a pair of collision prevention sections 221, 221 are provided in such a manner as to face inwardly from open edges of peripheral walls 206, 206 on necessary regions of peripheral walls 206, 206 of box 202 and lid 204 which overlap with each other or oppose each other inside and outside in the case "A", as in Embodiment 5. A key member 207 is inserted into the collision prevention sections 221, 221 in an extractable manner.

Although the peripheral walls 206, 206 having the collision prevention sections 221, 221 are designed to overlap each other inside and outside in this illustrated example, their edges could be designed to face each other.

At an end of the key member 207 is provided a latch member D which establishes a latched relationship with the box 202 or the lid 204 so as to prevent opening when insertion of the key member 207 has been completed.

An arrangement of the case "A" and the latch member D is the same as in Embodiment 5, so an explanation thereof will be omitted.

It is obvious that in Embodiment 6, the guide rails 213 are provided to guide insertion and extraction of the key member 207.

By providing the key member 207 and the case "A" of Embodiments 5 and 6 with locking structure B which is pressed back at a time of insertion of the key member 207, and which is freed from being pressed back and is automatically brought into a latched relationship at a time of completion of insertion, the key member 207 is prevented from being pulled out and then commodity "a" put in the case "A" is protected from being stolen by a customer.

The locking structure B is released from the latched relationship by using releasing tool C of the shop, and the key member 207 is pulled out with the releasing tool C and returned to the shop so that the case "A" can be used to put a commodity for rent or sale therein.

Figure 31:
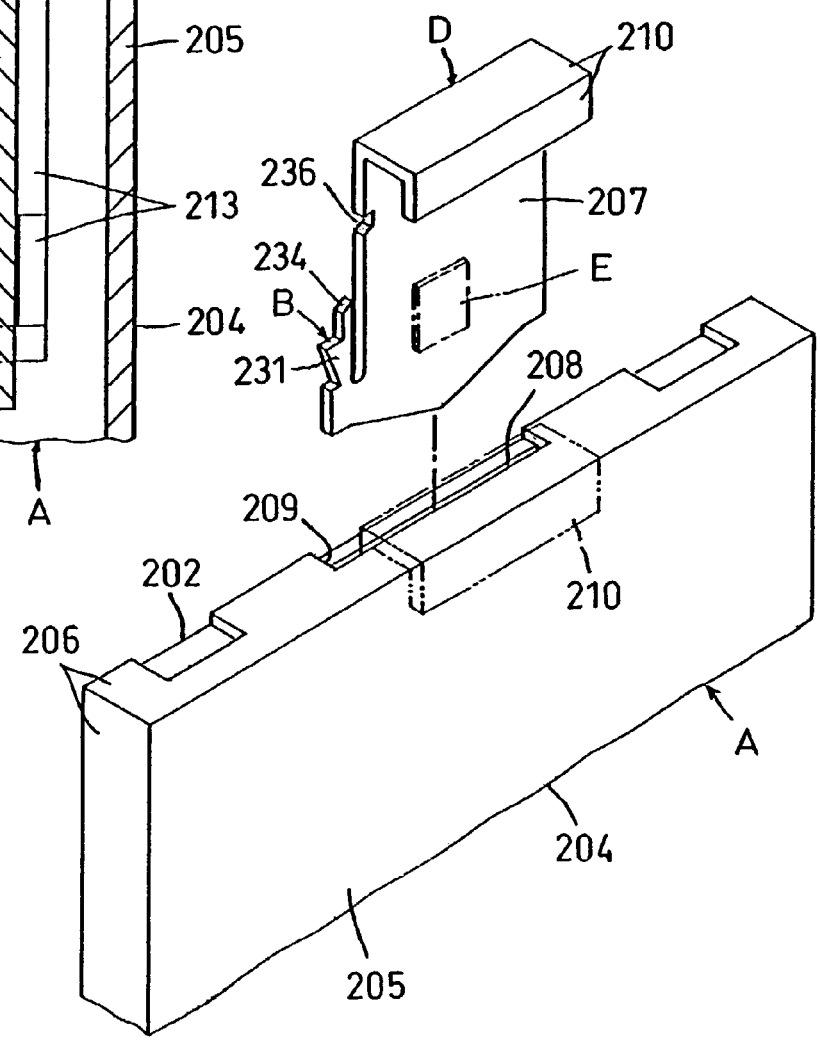
FIG. 31 is a perspective view showing an example of a latch member.
Figure 36:
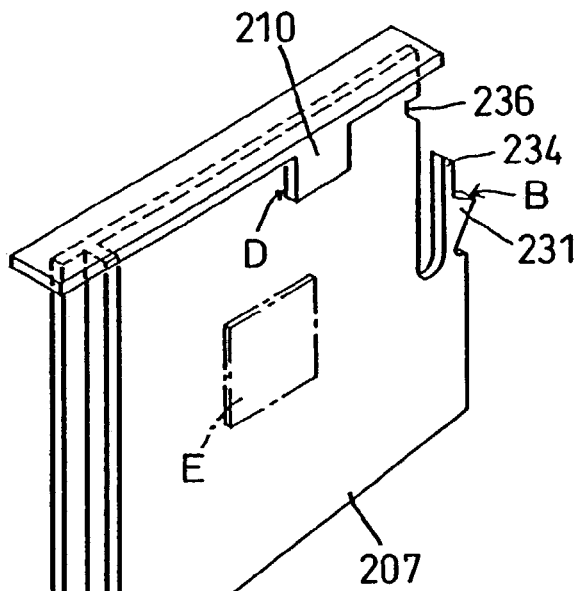
FIG. 36 is a perspective view of a key member.
Figure 32:
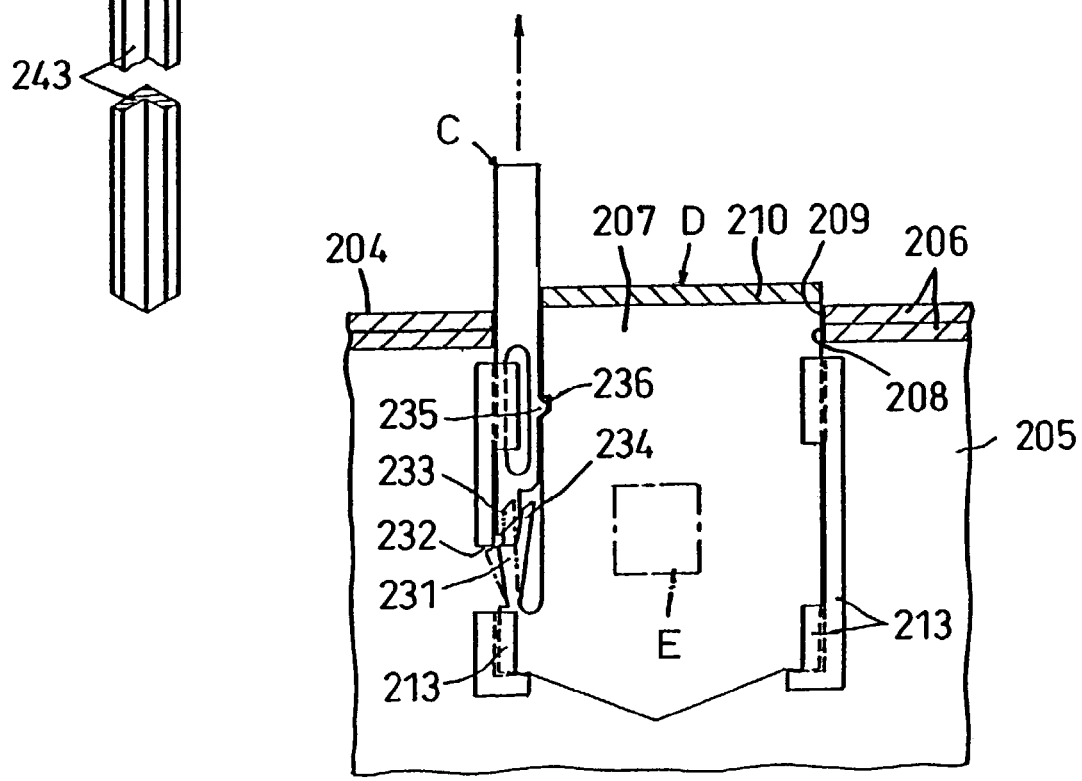
FIG. 32 is a vertical cross-sectional view showing a latched condition.

Such examples of the locking structure B and the releasing tool C are shown in Japanese Laid-open Patent Publication No. 2002-080086 (Publication date: Mar. 19, 2002) and Japanese Laid-open Patent Publication No. 2002-362668 (Publication date: Dec. 18, 2002), respectively. In FIGS. 31 and 32, for example, the locking structure B is composed of a latch hook 231 provided on a side edge of the key member 207 in such a manner that a degree of its projection increases in a downward direction of the key member 207; and a latch hole 232 to which the latch hook 231 is fitted in a middle of a guide rail 213 so as to protect the key member 207 from being pulled out. The latch hook 231 in contact with the guide rail 213 is pressed back when the key member 207 is being inserted, and the latch hook 231 coincides with the latch hole 232 when insertion of the key member 207 has been completed. Therefore, the latch hook 231 out of contact with the guide rail 213 is not pressed back any more, thereby causing the latch hook 231 to be fitted into the latch hole 232 automatically so as to establish a latched relationship. Thus, rem oval of the key member 207 is prevented.

The above-mentioned releasing tool C is inserted from the through portion 208 which is an opening for insertion or from the collision prevention sections 209, 221 towards the latch hook 231. A tapered projecting piece 233 projecting from an end of plate-shaped releasing tool C is fitted between the projecting piece 234 projecting from the latch hook 231 towards the end of the key member 207 and the guide rail 213. This continuous fitting causes the latch hook 231 to be released from the latch hole 232 (shifted from a position of the chain line to a position of the solid line in FIG. 32), thereby canceling the latched relationship.

As a result, the key member 207 can be pulled out together with the releasing tool C by abrasion resistance caused when the projecting piece 234 is press-fitted with the projecting piece 233 due to strength of stability of the latch hook 231 at a time of removing the releasing tool C.

When slippage is caused in an area of abrasion resistance, the key member 207 and the releasing tool C can be pulled out concurrently by providing a projection 235 and a concave portion 236 engaged with each other on a surface where the key member 207 and the releasing tool C oppose each other.

It is obvious that structures of the latch member D and the releasing tool C are not limited to those described above.

The key member 207 having a unique ID code can be attached with an antitheft tag E by embedding or applying glue, with the antitheft tag E modulating a high-frequency electromagnetic field installed at a gate of the shop when a resonance circuit resonates and transmits the unique ID code. This can prevent theft of a commodity with its case.

The through portion 208 and the collision prevention section 209 of Embodiment 5 (FIGS. 24–28) and the collision prevention sections 221, 221 of Embodiment 6 (FIGS. 29–33) are formed at a center of the peripheral walls 206, 206 in these illustrated examples; however, they can be formed according to an entire length of the peripheral walls 206, 206, that is, a width of the key member 207.

Figure 33:
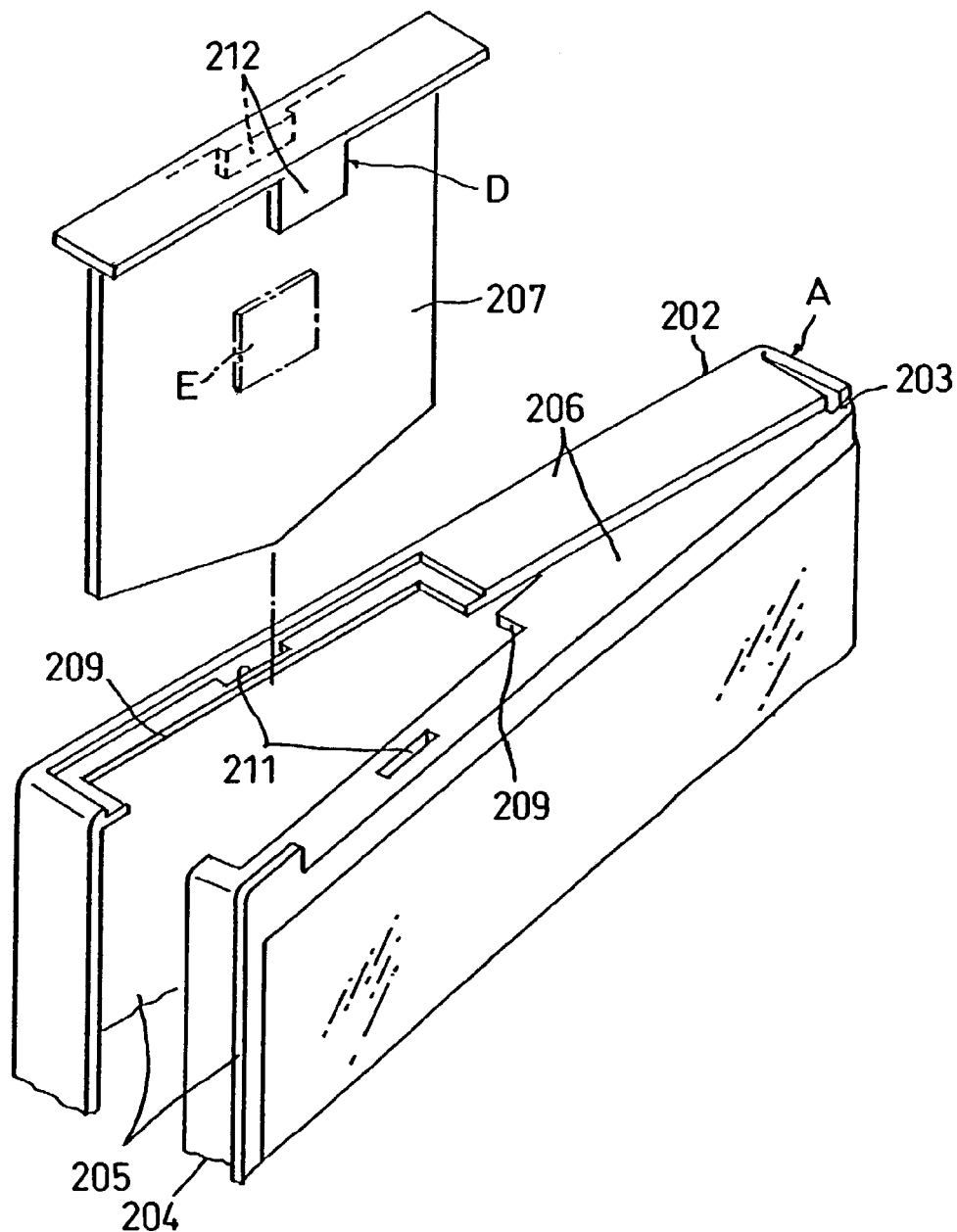
FIG. 33 is a perspective view showing another example of the latch member.

As shown in FIG. 33, projecting latch pieces 212 of latch member D are formed at both sides of an edge of key member 207, and the projecting latch pieces 212 are fitted into latch sections 211 formed on inner and outer peripheral walls 206, 206. As shown in FIG. 25, the projecting latch pieces 212 are not fitted into the latch sections 211 because they cover the main wall 205 from the peripheral wall 206.

Consequently, it becomes possible to avoid latch release by bending the projecting latch pieces 212 with a tool. Thus, an effect of preventing opening of the case "A" without permission can be further improved.

According to Embodiment 7 of the present invention, as shown in FIGS. 34 to 39, similar to Embodiment 5, case "A" is composed of a box 202 having an opening 201 for inserting and extracting a commodity "a", and a lid 204 for opening and closing the opening 201 via appropriate hinges 203. Inside edges of sides of the box 202 and the lid 204 that are opposite to sides having the hinges 203 in the case "A", bolt insertion portions 241 are dotted, and bolt hook portions 242 are arranged in series along side edges of the case "A".

Through portion 208 and collision prevention section 209, the same as in Embodiment 5, are arranged somewhere closer to the bolt hook portions 242 on the peripheral walls 206, 206 which overlap with each other inside and outside between the hinges 203 and the bolt hook portions 242 of the case "A".

A key member 207 to be inserted into the through portion 208 in order to close the case "A" is provided with a bolt member 243 which sequentially passes through the bolt insertion portions 241 aligned as shown in FIG. 37 when the key member 207 is inserted.

Even if a force in an opening direction is applied on an edge of the side opposite to the side having the hinges 203 in the case "A", the bolt member 243 passing through the bolt insertion portion 241 prevents opening due to a latched relationship between the bolt member 243 and each of the bolt hooking portions 242.

It goes without saying that for prevention of opening of the case "A", the key member 207 and the case "A" are also provided with the same latch member D as in Embodiment 5; that is, a combination of holding piece 210, latch sections 211, and projecting latch pieces 212.

Figure 34:
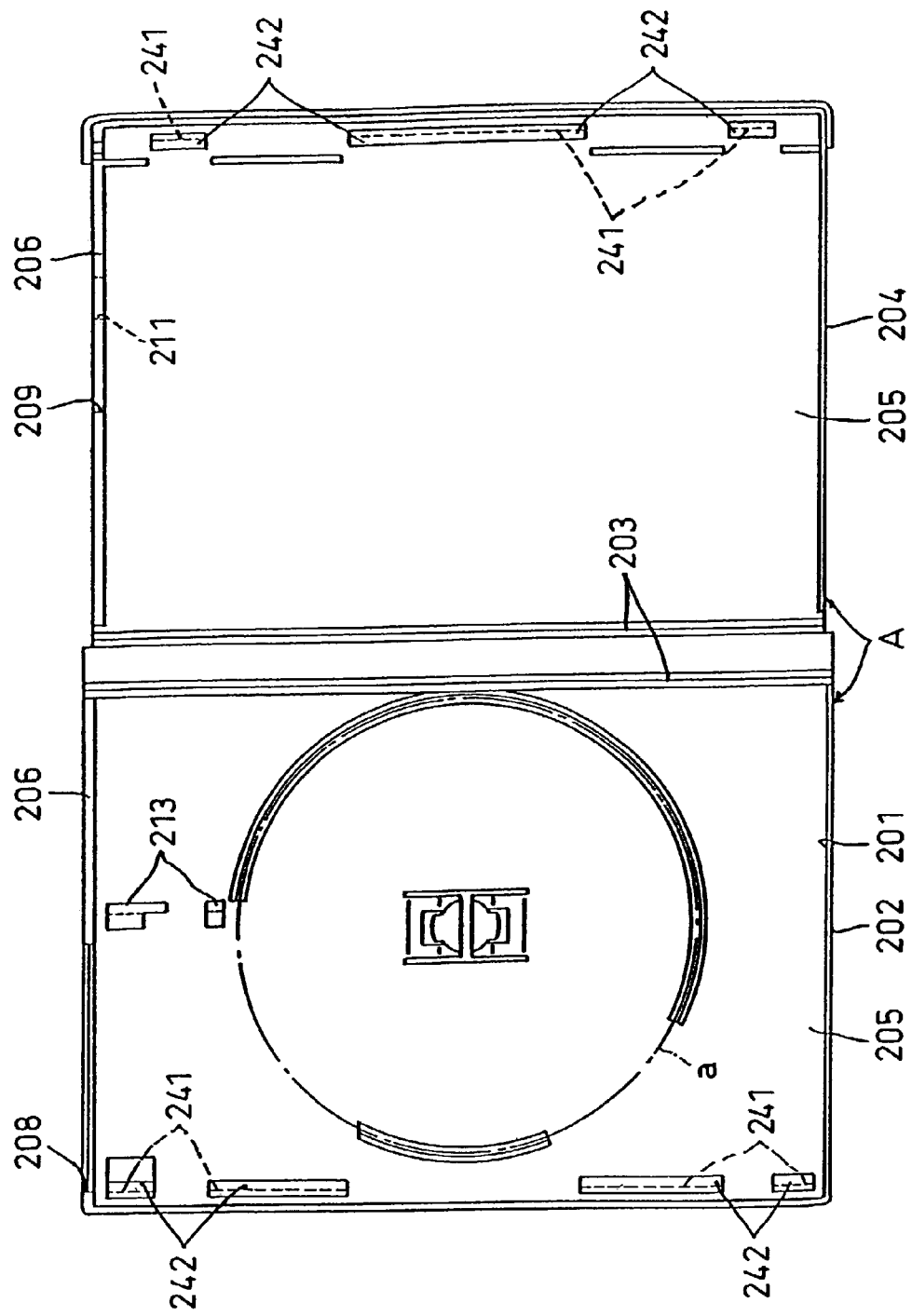
FIG. 34 is a development plan view of a case of Embodiment 7.
Figure 35:
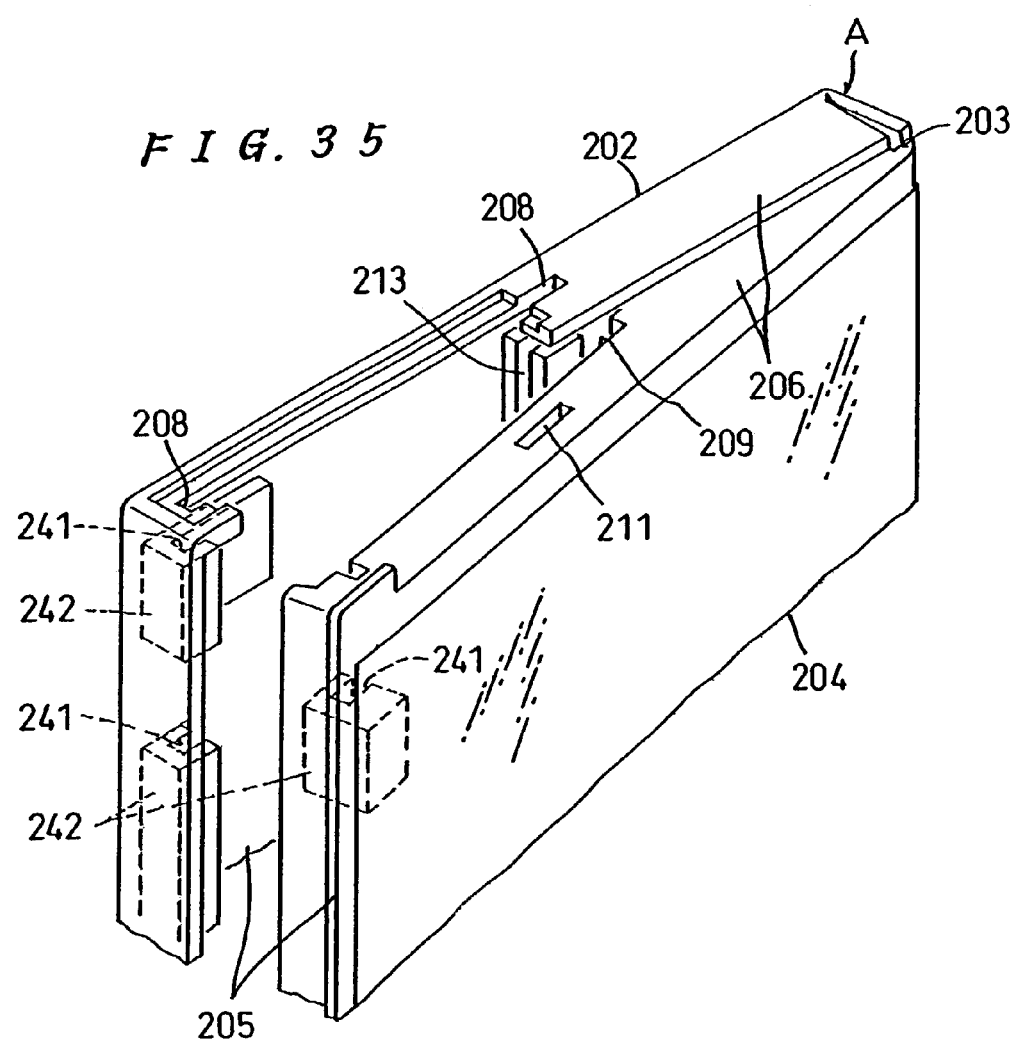
FIG. 35 is a perspective view showing a main part of the case of Embodiment 7.
Figure 40:
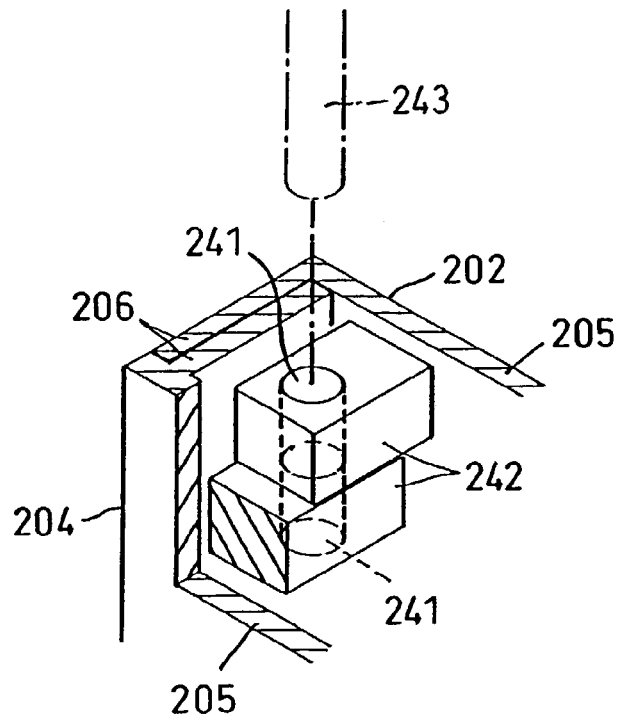
FIG. 40 is a perspective view showing another example of bolt hooking portions.
Figure 41:
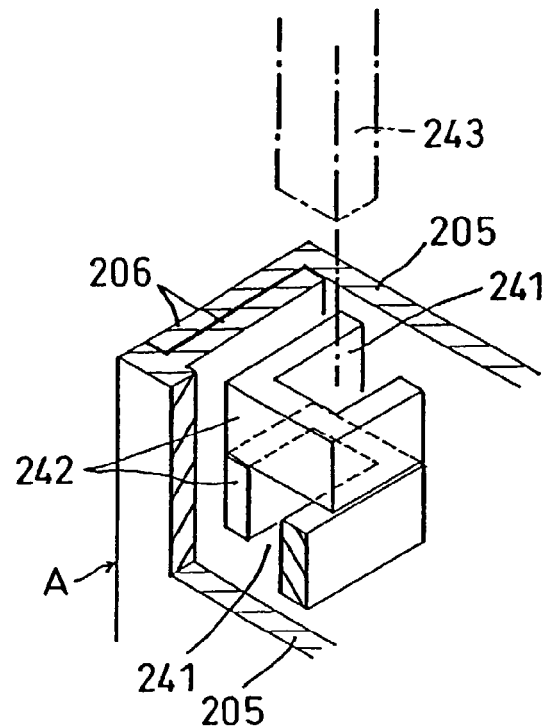
FIG. 41 is a perspective view of the bolt hooking portions.

Although the bolt hooking portions 242 having the bolt insertion portions 241 are dotted in the form of blocks with a trench as shown in FIGS. 34 and 35, they can be blocks having a through hole for an axial bolt member 243 to pass through as shown in FIG. 40, or U-shaped blocks for the bolt member 243 to be held therein as shown in FIG. 41.

In short, it is essential that inserted bolt member 243 and the bolt hooking portions 242 establish a latched relationship.

When the bolt hooking portions 242 are aligned while being engaged with each other when the case "A" is closed, the bolt hooking portions 242 at both ends can be arranged at corners of the case "A", thereby applying stronger force at the corners to reinforce prevention of opening.

Locking structure B which can release the latched relationship by using the releasing tool C of Embodiments 5 and 6 can be provided on a surface where the key member 207 equipped with the bolt member 243 opposes the case "A" so as to prevent the bolt member 243 from being pulled out together with the key member 207. This can protect the case "A" from being opened by a customer.

It is obvious that the key member 207 can be attached with the antitheft tag E of Embodiments 5 and 6 to protect the case "A" from being taken out of the shop.

Since each component in the case "A", the locking structure B, the releasing tool C, and the guide rails 213 are the same as those in Embodiments 5 and 6, their description will be omitted.

Besides the shape of the long hole, the through portion 208 can be so designed that a longitudinal side edge of the long hole is cut except at both ends so as to latch both side edges of the key member 207 by both ends of the long hole.

Figure 42:
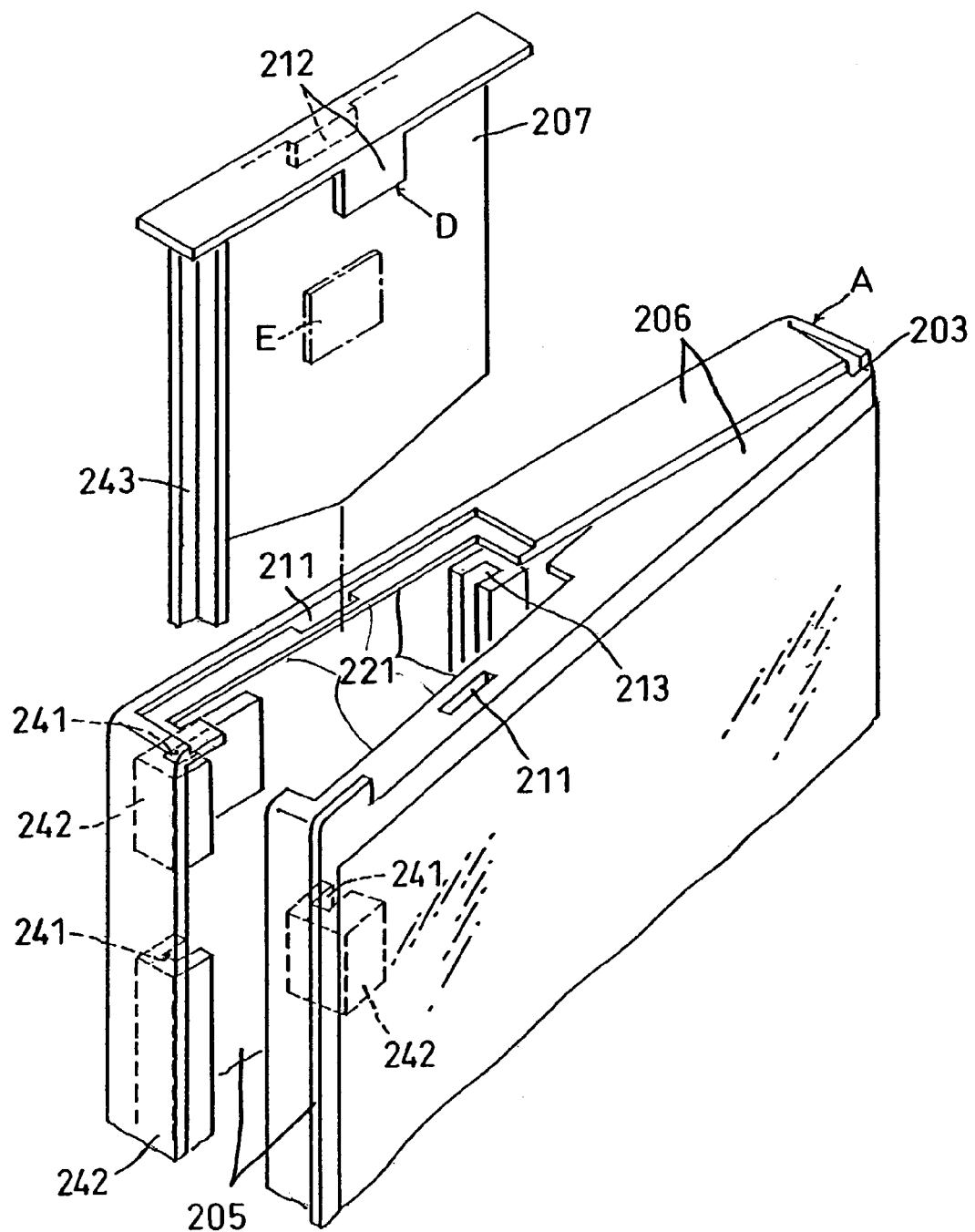
FIG. 42 is a perspective view showing Embodiment 8.

According to Embodiment 8 of the present invention, as shown in FIG. 42, in the case "A" equipped with the collision prevention sections 221, 221 which oppose each other on the peripheral walls 206, 206 of Embodiment 6 (either the holding piece 212 is fitted into the key member 207 or the projecting latch pieces 212 are fitted into the latch sections 211), the bolt hooking portions 242 and the bolt insertion portions 241 are formed on the box 202 and the lid 204 of the case "A", and the bolt member 243 is formed on the key member 207. The collision prevention sections 221, 221 opposing each other are arranged somewhere closer to the bolt hook portions 242 on the peripheral walls 206, 206, which overlap with each other inside and outside or oppose each other between the hinges 203 and the bolt hook portions 241 of the case "A".

As a result, when the key member 207 is inserted into the collision prevention sections 221, 221 in the same manner as in Embodiment 7, the bolt member 243 passes through the bolt insertion portions 241 composed of the bolt hooking portions 242.

Since the collision prevention sections 221, 221 do not have a latched relationship with the key member 207, in the same manner as in Embodiment 6, for prevention of opening of the case "A", the key member 207 is equipped with the holding piece 210, or the key member 207 and the peripheral wall 206 are provided with the latch member D composed of the projecting latch pieces 212 and the latch sections 211.

Since each component in the case "A", the locking structure B using the releasing tool C, the guide rails 213, the latch member D, the key member 207, the antitheft tag E, and the bolt hooking portions 242 having the bolt member 243 and the bolt insertion portions 241 are the same as those in Embodiments 5, 6, and 7, their description will be omitted.

Figure 43:
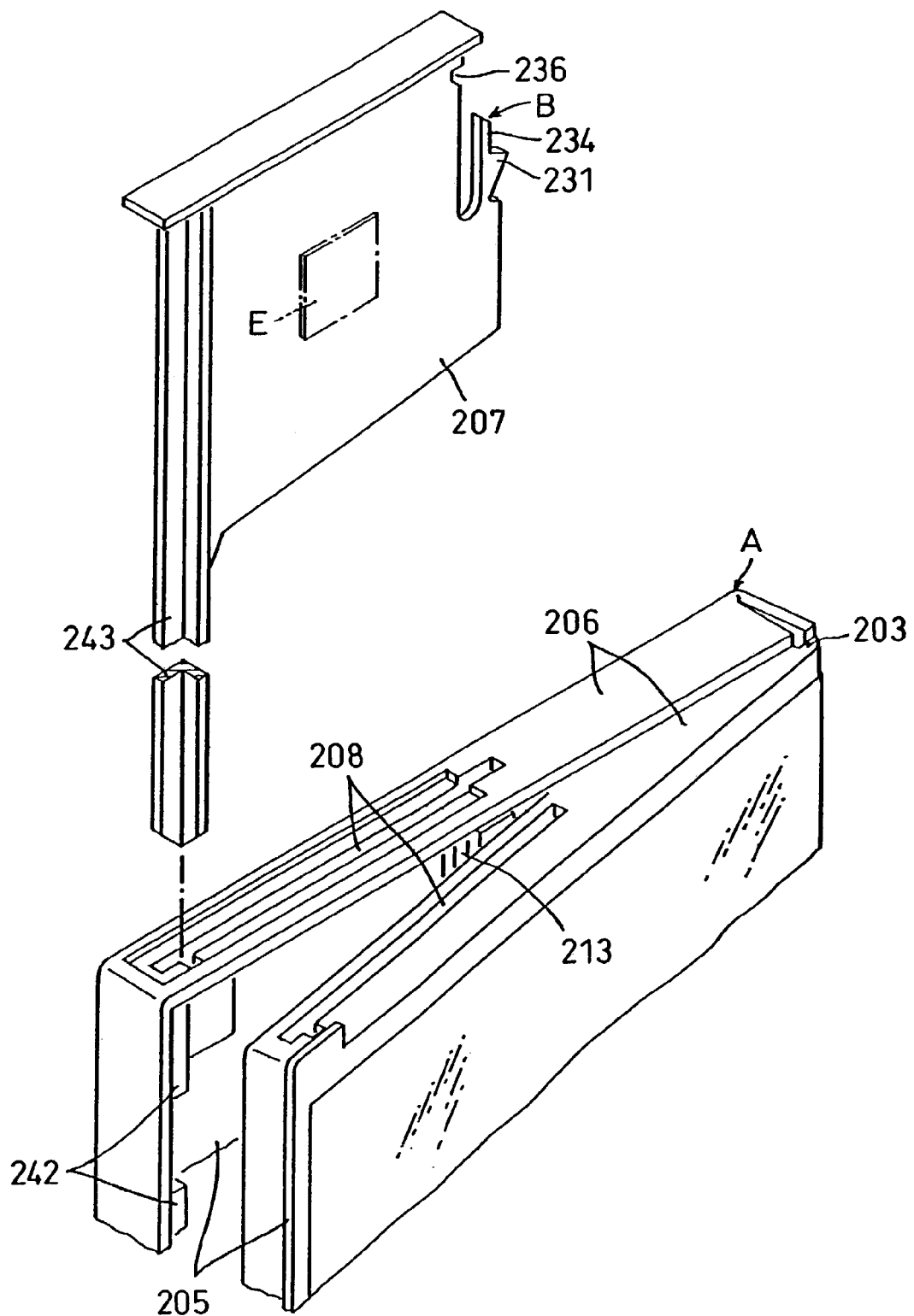
FIG. 43 is a perspective view showing another example of a through portion.

As shown in FIG. 43, a combination of the through portion 208 and the collision prevention section 209 of Embodiments 7 and 8, or a combination of the collision prevention sections 221, 221, can be replaced by the through portion 208 so formed as to coincide with both peripheral walls 206, 206, and the key member 207 equipped with the bolt member 243 related to the bolt insertion portions 241 can be inserted into the through hole 208 to obtain the same effects.

Figure 44:
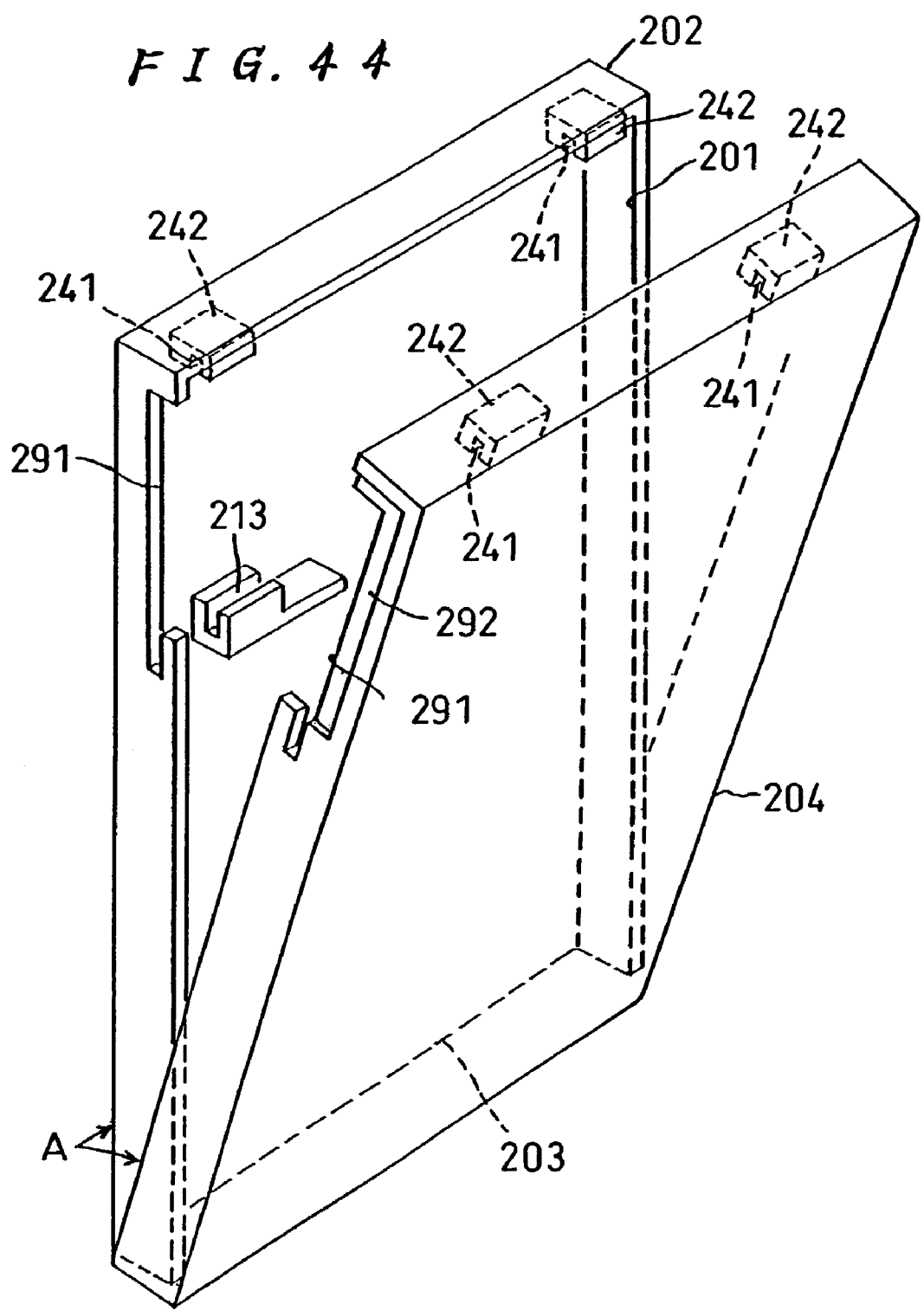
FIG. 44 is a perspective view showing Embodiment 9.
Figure 45:
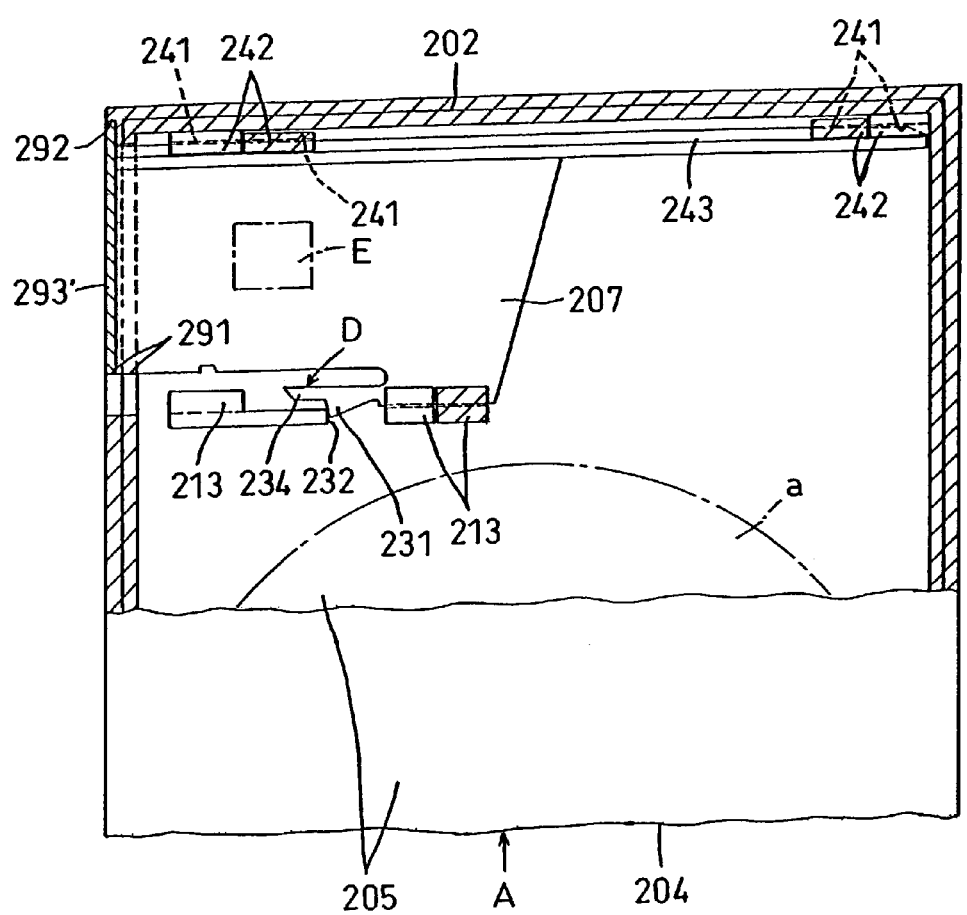
FIG. 45 is a partial front view of a case where a key member has been inserted.

According to Embodiment 9 of the present invention, as shown in FIGS. 44–46, similar to Embodiments 5 and 6, case "A" is composed of a box 202 having an opening 201 for inserting and extracting a commodity "a", and a lid 204 for opening and closing the opening 201 via appropriate hinges 203.

Inside edges of sides of the box 202 and the lid 204 that are opposite to sides having the hinges 203 in the case "A" are arranged bolt hook portions 242 having the same bolt insertion portions 241 as those in Embodiment 7.

Since the box 202, the lid 204, the hinges 203, and the bolt hooking portions 242 with the bolt insertion portions 241 in the case "A" are the same as those in Embodiments 5 and 7, their description will be omitted.

A through portion 291 which allows a key member 207 to be inserted or extracted is provided on a peripheral wall 206 between the hinges 203 and an edge of a side of the case "A" that can be opened and closed.

The through portion 291 is provided only to insert the key member 207 therein, and a side edge of the through portion 291 is not in a latched relationship with the key member 207 at a time of inserting the key member 207. This means that the case "A" is in a condition of being able to be opened.

Therefore, the key member 207 is equipped with a bolt member 243 which passes through all the bolt insertion portions 241 of the bolt hooking portions 242 aligned as in Embodiments 7 and 8 at the time of inserting the key member 207.

Thus, the bolt member 243 can prevent the side edge of the case "A" from being opened as in Embodiments 7 and 8.

Guiding an opposite side edge of the bolt member 243 of the key member 207 by providing the guide rails 213 inside the case "A" can make insertion of the key member 207 smooth, and can also offer an effect as a bolt when the guide rails 213 are formed on both the box 202 and the lid 204.

Providing locking structure B which can release the latched relationship by using the same releasing tool E of Embodiments 5 and 6 on the key member 207 and the case "A" can protect the key member 207 from being pulled out by a customer. It is also possible to attach the same antitheft tag E as in Embodiment 6 to the key member 207.

The bolt member 243 is the same as that in Embodiments 7 and 8, and the locking structure B and the releasing tool C are the same as those in Embodiment 6, so their description will be omitted.

The through portion 291 in this illustrated example is designed in such a manner that the peripheral wall 206 is partly cut and a flange 293 formed at an edge of the key member 207 is fitted into a convex portion 292 formed on a surface of the peripheral wall 206; however, the through portion 291 could be designed differently.

According to the antitheft device of the present invention, engagement of convex-concave portions on a surface where an inserted key member and a through hole of a case oppose each other, or on a flange of the key member and an edge of the through hole, can protect a case from being opened with a tool and a commodity in the case from being stolen.

The same effects can be obtained from the convex-concave portions formed on peripheral walls of the case.

Holding-down structure can prevent an outer peripheral wall from being bent outwardly when an external pressure is applied on overlapping peripheral walls, thereby preventing this peripheral wall from being forcibly bent to pry open the case.

Even if someone hooks a finger at peripheral wall 6 to pry open the case, convex-concave portions 71 bite into the finger to hurt it, thereby dissuading him/her from forcibly opening the case.

According to the present invention, the case can be prevented from being forcibly opened because of presence of a latch member composed of an inserted key member and the box or the lid, thereby preventing theft of a commodity put in the case.

In addition, a key member pulled out is kept in a shop to reuse the case "A" to store a commodity for rent or sale. Since a bolt member formed on the key member passes through bolt insertion portions of bolt hooking portions of the box and the lid, the bolt member can prevent opening even if a force is applied on an edge of a side opposite to a side having hinges, thereby preventing theft of a commodity in the case.

What is claimed is:

1. A case comprising:
a box having an opening through which a commodity is to be inserted and extracted, said box having a wall that defines part of said opening;
a lid attached to said box via at least one hinge so as to open and close said opening, said lid having a wall;
a passage in one of said wall of said box and said wall of said lid, said passage being constructed and arranged to allow a key member to pass therethrough in an extractable manner;
a collision prevention portion on the other of said wall of said box and said wall of said lid so as to allow for said opening to be closed by said lid, while the key member is received within said passage, without said other of said wall of said box and said wall of said lid impacting the key member;
a bolt hooking portion having a bolt insertion portion, said bolt hooking portion provided along an inner edge of said box and an inner edge of said lid when said opening is closed by said lid, said inner edge of said box and said inner edge of said lid defining a side of the case that is opposite to a side of the case where said at least one hinge is located; and
another bolt hooking portion having a bolt insertion portion,
wherein the key member has a latch member at one end thereof for establishing a latched relationship between the key member and said box and lid, when said opening is closed by said lid and the key member is received within said passage, so as to prevent said lid from opening said opening,
wherein the key member includes a bolt member that is to pass through said bolt insertion portion, when the key member is received within said passage, so as to latch the key member to said box and said lid,
wherein said wall of said box and said wall of said lid overlap one another when said opening is closed by said lid,
wherein said wall of said box and said wall of said lid are positioned between the side of the case where said at least one hinge is located and the side of the case defined by said inner edge of said box and said inner edge of said lid along which said bolt hooking portion is provided, when said opening is closed by said lid, and
wherein said another bolt hooking portion is provided along said inner edge of said box when said opening is not closed by said lid, and said bolt hooking portion is provided along said inner edge of said lid when said opening is not closed by said lid,
such that when said opening is closed by said lid, said bolt hooking portion and said another bolt hooking portion are arranged in series along said inner edge of said box and said inner edge of said lid, whereby the bolt member is to pass through said bolt insertion portion of said bolt hooking portion and said bolt insertion portion of said another bolt hooking portion when the key member is received within said passage, so as to latch the key member to said box and said lid.

2. The case according to claim 1, further comprising:
an additional bolt hooking portion having a bolt insertion portion,
wherein said additional bolt hooking portion is provided along one of said inner edge of said box and said inner edge of said lid when said opening is not closed by said lid,
such that when said opening is closed by said lid, said bolt hooking portion, said another bolt hooking portion and said additional bolt hooking portion are arranged in series along said inner edge of said box and said inner edge of said lid, whereby the bolt member is to pass through said bolt insertion portion of said bolt hooking portion, said bolt insertion portion of said another bolt hooking portion and said bolt insertion portion of said additional bolt hooking portion when the key member is received within said passage, so as to latch the key member to said box and said lid.

3. A case comprising:
a box having an opening through which a commodity is to be inserted and extracted, said box having a wall that defines part of said opening;
a lid attached to said box via at least one hinge so as to open and close said opening, said lid having a wall;
a first collision prevention portion on said wall of said box;
a second collision prevention portion on said wall of said lid, said first collision prevention portion and said second collision prevention portion cooperating with one another to define a passage when said opening is closed by said lid, said passage being constructed and arranged to allow a key member to pass therethrough in a detectable manner;
a bolt hooking portion having a bolt insertion portion, said bolt hooking portion provided along an inner edge of said box and an inner edge of said lid when said opening is closed by said lid, said inner edge of said box and said inner edge of said lid defining a side of the case that is opposite to a side of the case where said at least one hinge is located; and
another bolt hooking portion having a bolt insertion portion,
wherein the key member has a latch member at one end thereof for establishing a latched relationship between the key member and said box and lid, when said opening is closed by said lid and the key member is received within said passage, so as to prevent said lid from opening said opening,
wherein the key member includes a bolt member that is to pass through said bolt insertion portion, when the key member is received within said passage, so as to latch the key member to said box and said lid, wherein said wall of said box and said wall of said lid overlap one another when said opening is closed by said lid, wherein said wall of said box and said wall of said lid are positioned between the side of the case where said at least one hinge is located and the side of the case defined by said inner edge of said box and said inner edge of said lid along which said bolt hooking portion is provided, when said opening is closed by said lid, and wherein said another bolt hooking portion is provided along said inner edge of said box when said opening is not closed by said lid, and said bolt hooking portion is provided along said inner edge of said lid when said opening is not closed by said lid, such that when said opening is closed by said lid, said bolt hooking portion and said another bolt hooking portion are arranged in series along said inner edge of said box and said inner edge of said lid, whereby the bolt member is to pass through said bolt insertion portion of said bolt hooking portion and said bolt insertion portion of said another bolt hooking portion when the key member is received within said passage, so as to latch the key member to said box and said lid.

4. The case according to claim 3, further comprising:

an additional bolt hooking portion having a bolt insertion portion, wherein said additional bolt hooking portion is provided along one of said inner edge of said box and said inner edge of said lid when said opening is not closed by said lid, such that when said opening is closed by said lid, said bolt hooking portion, said another bolt hooking portion and said additional bolt hooking portion are arranged in series along said inner edge of said box and said inner edge of said lid, whereby the bolt member is to pass through said bolt insertion portion of said bolt hooking portion, said bolt insertion portion of said another bolt hooking portion and said bolt insertion portion of said additional bolt hooking portion when the key member is received within said passage, so as to latch the key member to said box and said lid.

5. A case comprising:

a box having an opening through which a commodity is to be inserted and extracted, said box having a wall that defines part of said opening;

a lid attached to said box via at least one hinge so as to open and close said opening, said lid having a wall;

a first collision prevention portion on said wall of said box;

a second collision prevention portion on said wall of said lid, said first collision prevention portion and said second collision prevention portion cooperating with one another to define a passage when said opening is closed by said lid, said passage being constructed and arranged to allow a key member to pass therethrough in a detectable manner;

a bolt hooking portion having a bolt insertion portion, said bolt hooking portion provided along an inner edge of said box and an inner edge of said lid when said opening is closed by said lid, said inner edge of said box and said inner edge of said lid defining a side of the case that is opposite to a side of the case where said at least one hinge is located; and another bolt hooking portion having a bolt insertion portion, wherein the key member has a latch member at one end thereof for establishing a latched relationship between the key member and said box and lid, when said opening is closed by said lid and the key member is received within said passage, so as to prevent said lid from opening said opening, wherein the key member includes a bolt member that is to pass through said bolt insertion portion, when the key member is received within said passage, so as to latch the key member to said box and said lid, wherein said wall of said box and said wall of said lid oppose one another when said opening is closed by said lid, wherein said wall of said box and said wall of said lid are positioned between the side of the case where said at least one hinge is located and the side of the case defined by said inner edge of said box and said inner edge of said lid along which said bolt hooking portion is provided, when said opening is closed by said lid, and wherein said another bolt hooking portion is provided along said inner edge of said box when said opening is not closed by said lid, and said bolt hooking portion is provided along said inner edge of said lid when said opening is not closed by said lid, such that when said opening is closed by said lid, said bolt hooking portion and said another bolt hooking portion are arranged in series along said inner edge of said box and said inner edge of said lid, whereby the bolt member is to pass through said bolt insertion portion of said bolt hooking portion and said bolt insertion portion of said another bolt hooking portion when the key member is received within said passage, so as to latch the key member to said box and said lid.

6. The case according to claim 5, further comprising:

an additional bolt hooking portion having a bolt insertion portion, wherein said additional bolt hooking portion is provided along one of said inner edge of said box and said inner edge of said lid when said opening is not closed by said lid, such that when said opening is closed by said lid, said bolt hooking portion, said another bolt hooking portion and said additional bolt hooking portion are arranged in series along said inner edge of said box and said inner edge of said lid, whereby the bolt member is to pass through said bolt insertion portion of said bolt hooking portion, said bolt insertion portion of said another bolt hooking portion and said bolt insertion portion of said additional bolt hooking portion when the key member is received within said passage, so as to latch the key member to said box and said lid.

7. A case comprising:

a box having an opening through which a commodity is to be inserted and extracted, said box having a wall that defines part of said opening;

a lid attached to said box via at least one hinge so as to open and close said opening, said lid having a wall that cooperates with said wall of said box to define a passage when said opening is closed by said lid, said passage for allowing a key member to pass therethrough in an extractable manner;

a bolt hooking portion having a bolt insertion portion, said bolt hooking portion provided along an inner edge of said box and an inner edge of said lid when said opening is closed by said lid, said inner edge of said box and said inner edge of said lid defining a side of the case that is opposite to a side of the case where said at least one hinge is located; and another bolt hooking portion having a bolt insertion portion, wherein a bolt member is to pass through said bolt insertion portion, when the key member is received within said passage, so as to latch said box to said lid, wherein said wall of said box and said wall of said lid are positioned between the side of the case where said at least one hinge is located and the side of the case defined by said inner edge of said box and said inner edge of said lid along which said bolt hooking portion is provided, when said opening is closed by said lid, and wherein said another bolt hooking portion is provided along said inner edge of said box when said opening is not closed by said lid, and said bolt hooking portion is provided along said inner edge of said lid when said opening is not closed by said lid, such that when said opening is closed by said lid, said bolt hooking portion and said another bolt hooking portion are arranged in series along said inner edge of said box and said inner edge of said lid, whereby the bolt member is to pass through said bolt insertion portion of said bolt hooking portion and said bolt insertion portion of said another bolt hooking portion when the key member is received within said passage, so as to latch the key member to said box and said lid.

8. The case according to claim 7, further comprising:

an additional bolt hooking portion having a bolt insertion portion, wherein said additional bolt hooking portion is provided along one of said inner edge of said box and said inner edge of said lid when said opening is not closed by said lid, such that when said opening is closed by said lid, said bolt hooking portion, said another bolt hooking portion and said additional bolt hooking portion are arranged in series along said inner edge of said box and said inner edge of said lid, whereby the bolt member is to pass through said bolt insertion portion of said bolt hooking portion, said bolt insertion portion of said another bolt hooking portion and said bolt insertion portion of said additional bolt hooking portion when the key member is received within said passage, so as to latch the key member to said box and said lid.

9. The case according to claim 8, wherein said bolt is integral with the key member.

* * * * *